(12) United States Patent
Seto et al.

(10) Patent No.: US 12,538,126 B2
(45) Date of Patent: Jan. 27, 2026

(54) COMMUNICATION METHOD AND COMMUNICATION SYSTEM

(71) Applicant: Yamaha Corporation, Shizuoka (JP)

(72) Inventors: Yuki Seto, Tokyo (JP); Takahiro Iwata, Tokyo (JP); Tomohiro Imoto, Yokohama (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 18/814,401

(22) Filed: Aug. 23, 2024

(65) Prior Publication Data

US 2024/0422539 A1    Dec. 19, 2024

Related U.S. Application Data

(63) Continuation of application No. PCT/JP2022/048169, filed on Dec. 27, 2022.

(30) Foreign Application Priority Data

Mar. 1, 2022 (JP) .................................. 2022-030796

(51) Int. Cl.
*H04W 12/06* (2021.01)
*G06F 21/44* (2013.01)
*H04W 12/08* (2021.01)
*H04W 12/63* (2021.01)

(52) U.S. Cl.
CPC ........... *H04W 12/06* (2013.01); *H04W 12/63* (2021.01)

(58) Field of Classification Search
None
See application file for complete search history.

(56) References Cited

U.S. PATENT DOCUMENTS

2021/0264374 A1*   8/2021   Vo ...................... G06V 40/161

FOREIGN PATENT DOCUMENTS

| JP | 2000-244674 A | 9/2000 |
|---|---|---|
| JP | 2009-151495 A | 7/2009 |
| JP | 2020-167538 A | 10/2020 |
| KR | 10-2015-0053654 A | 5/2015 |
| KR | 10-1708394 B1 | 2/2017 |
| KR | 1017083940000 A1 * | 2/2017 |
| KR | 10-2130168 B1 | 7/2020 |

OTHER PUBLICATIONS

REVITS: Railway E-Verification Information and Ticketing System. Chatterjee et al. IEEE. (Year: 2020).*
The Implementation Model of the Emergency Video Call System for Deep-Depth and High-Rise Buildings Lifts. Kim et al. Indian Journal of Science and Technology. (Year: 2015).*

(Continued)

*Primary Examiner* — Venkat Perungavoor
(74) *Attorney, Agent, or Firm* — Global IP Counselors, LLP

(57) ABSTRACT

A communication method includes transmitting authentication information from a transmitter disposed inside a facility to an area within the facility, and starting communication between a staff terminal held by facility staff of the facility and a user terminal that has received the authentication information transmitted by the transmitter, in response to a connection request transmitted from the user terminal.

16 Claims, 21 Drawing Sheets

(56) References Cited

OTHER PUBLICATIONS

Prototype of Automatic Control of Freight Elevator Models in a 3-Floor Building. Lodovika et al. IEEE. (Year: 2023).*
Short Message Service Transmission System. Hui et al. Advanced Science and Technology Letters. (Year: 2013).*
International Search Report in PCT/JP2022/048169, dated Feb. 28, 2023.

* cited by examiner

FIG. 17

| | STATION NAME | AUTHENTICATION INFORMATION | CONNECTION DESTINATION INFORMATION |
|---|---|---|---|
| R1 | A STATION | qwe1rty2uio | 012.34.56.789 |
| R2 | B STATION | p3asd4fgh5j | 012.34.56.789 |
| R3 | C STATION | kl6zxc7vbn8m | 091.82.73.654 |
| | ... | ... | ... |

DB2 — D1 / D2 / D3

DB4

| | STATION NAME | LOCATION | AUTHENTICATION INFORMATION | CONNECTION DESTINATION INFORMATION |
|---|---|---|---|---|
| R8 | A STATION | PLATFORM 1 | qwe1rty2uio | 012.34.56.789 |
| R9 | A STATION | PLATFORM 2 | okm0ijn8uhb | 012.34.56.789 |
| R10 | A STATION | CONCOURSE INSIDE TICKET GATES | ygv7tfc6rdx | 012.34.56.789 |
| R11 | A STATION | CONCOURSE OUTSIDE TICKET GATES | esz5waq4plo | 987.34.56.210 |
| | ... | ... | ... | ... |

COMMUNICATION METHOD AND COMMUNICATION SYSTEM

CROSS-REFERENCE TO RELATED APPLICATIONS

This application is a continuation application of International Application No. PCT/JP2022/048169, filed on Dec. 27, 2022, which claims priority to Japanese Patent Application No. 2022-030796 filed in Japan on Mar. 1, 2022. The entire disclosures of International Application No. PCT/JP2022/048169 and Japanese Patent Application No. 2022-030796 are hereby incorporated herein by reference.

BACKGROUND

Technological Field

The present disclosure relates to a technology for connecting a user terminal carried by a user and a staff terminal held by a facility staff.

Background Technology

Conventionally, there are cases in which a facility is provided with an intercom to allow a user visiting the facility to talk with facility staff. For example, a visitor response system disclosed in Japanese Laid Open Patent Application No. 2020-167538 comprises an entrance unit of an intercom, a visitor terminal that allows a visitor to call a resident, a resident terminal that allows a resident to respond to a call from a visitor, and a cloud server located on an external network. The entrance unit displays, on a display unit, an information code including identification information of the entrance unit, and the visitor terminal reads said information code with a camera and uses a calling unit to call the resident terminal via the cloud server.

SUMMARY

In Japanese Laid Open Patent Application No. 2020-167538 described above, the information code displayed on the entrance unit is read to confirm that a visitor is actually visiting a resident's home. A configuration like Japanese Laid Open Patent Application No. 2020-167538 is effective in facilities that are small-scale and where the movement paths of visitors are generally fixed, such as homes. On the other hand, if Japanese Laid Open Patent Application No. 2020-167538 is applied to a large-scale facility such as a train station, the user must identify, and move to, the location where the information code is displayed. Depending on the size of the facility, the user may not be able to reach the information code and not be able to contact the staff.

An object of one aspect of the present disclosure is to facilitate communication from a user to a facility staff.

In order to solve the problem described above, a communication method according to one aspect of the present disclosure comprises transmitting authentication information from a transmitter disposed inside a facility to an area within the facility, and starting communication between a staff terminal held by facility staff of the facility and a user terminal that has received the authentication information transmitted by the transmitter, in response to a connection request transmitted from the user terminal.

In addition, a communication system according to one aspect of the this disclosure comprises a transmitter disposed in a facility and configured to transmit authentication information to an area within the facility, and a wireless or wired communicator connected wirelessly or by wire to a communication network. The wireless or wired communicator is configured to start communication, via the communication network, between a staff terminal held by facility staff of the facility and a user terminal that has received the authentication information transmitted by the transmitter, in response to a connection request transmitted from the user terminal.

BRIEF DESCRIPTION OF THE DRAWINGS

FIG. 17 is a diagram showing one example of an authentication information database DB2 of the second embodiment.

FIG. 21 is a diagram showing one example of an authentication information database DB4 in a modified example.

DETAILED DESCRIPTION OF THE EMBODIMENTS

Selected embodiments will now be explained in detail below, with reference to the drawings as appropriate. It will be apparent to those skilled in the field from this disclosure that the following descriptions of the embodiments are provided for illustration only and not for the purpose of limiting the invention as defined by the appended claims and their equivalents.

A: First Embodiment

Figure 1:
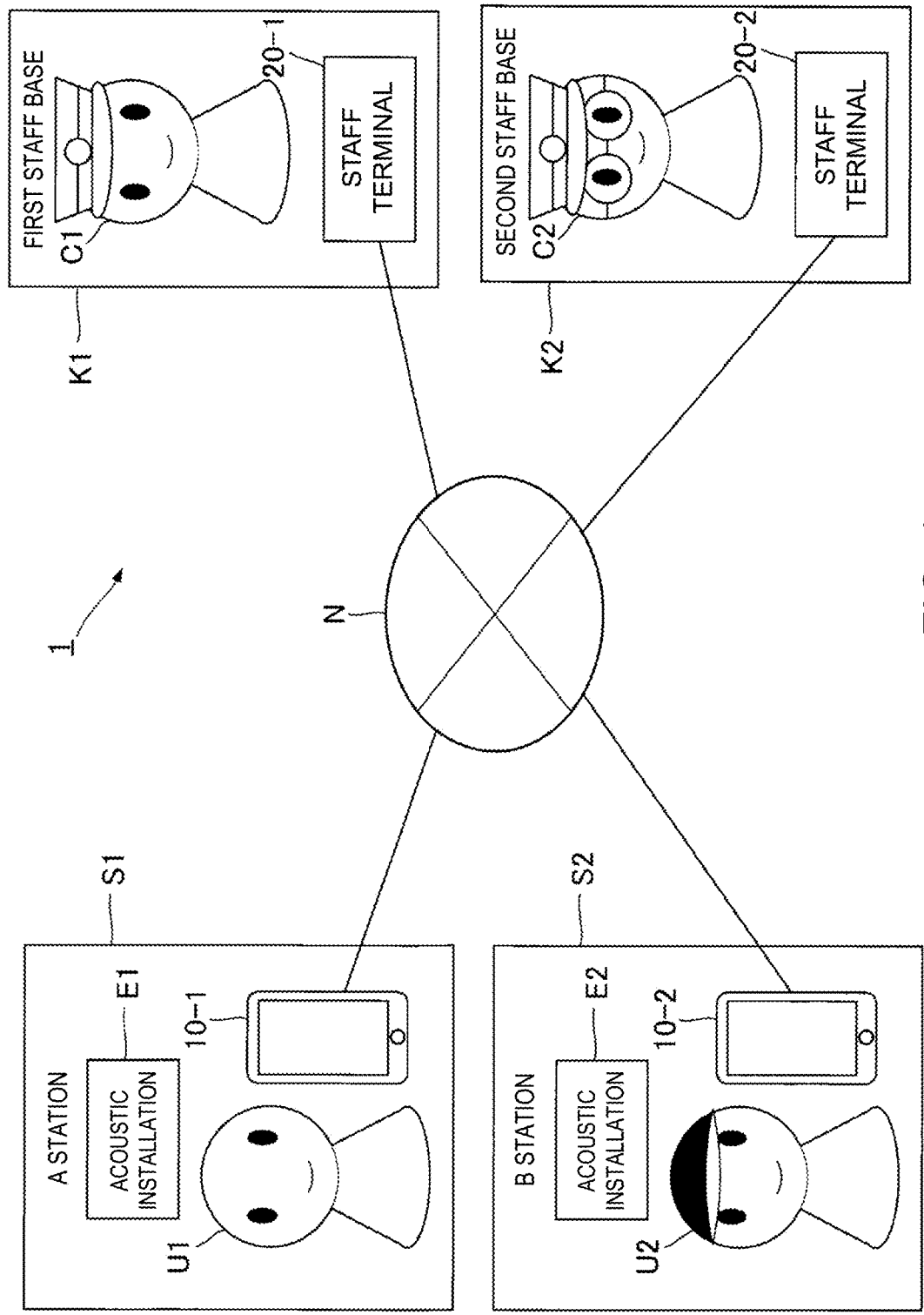
FIG. 1 is a diagram showing a configuration of a communication system 1 according to a first embodiment.

FIG. 1 is a diagram showing a configuration of a communication system 1 according to a first embodiment. The communication system 1 is a system for carrying out communication between a user terminal 10 (10-1 or 10-2) and a staff terminal 20 (20-1 or 20-2). The user terminals 10-1, 10-2 and the staff terminals 20-1, 20-2 are respectively connected to a communication network N. The communication network N can be a wide area network, such as the Internet, or a local area network (LAN) within a facility.

The user terminal 10-1 is an information processing terminal carried by a user U1. The location of the user terminal 10-1 and the location of the user U1 can be regarded as the same. The user terminal 10-2 is an information processing terminal carried by a user U2. The location of the user terminal 10-2 and the location of the user U2 can be regarded as the same. The user terminals 10-1, 10-2 are, for example, smartphones, tablets, laptop computers, or the like. In the present embodiment, the user terminals 10-1, 10-2 are smartphones. The user U1 is located in A station S1. The user U2 is located in B station S2. A station S1 and B station S2 are railway stations, and the users U1 and U2 are railway users.

A station S1 and B station S2 are examples of facilities. A facility is a location where the users U1, U2 visit for some purpose. The facility can be a sales facility that sells products, such as a shopping mall, a department store, and a convenience store, a service facility that provides commercial services, such as an amusement park, a railway station, and a hospital, or a public facility that provides public services, such as a government office, a library, and a park. The facility can or cannot have a building.

Figure 2:
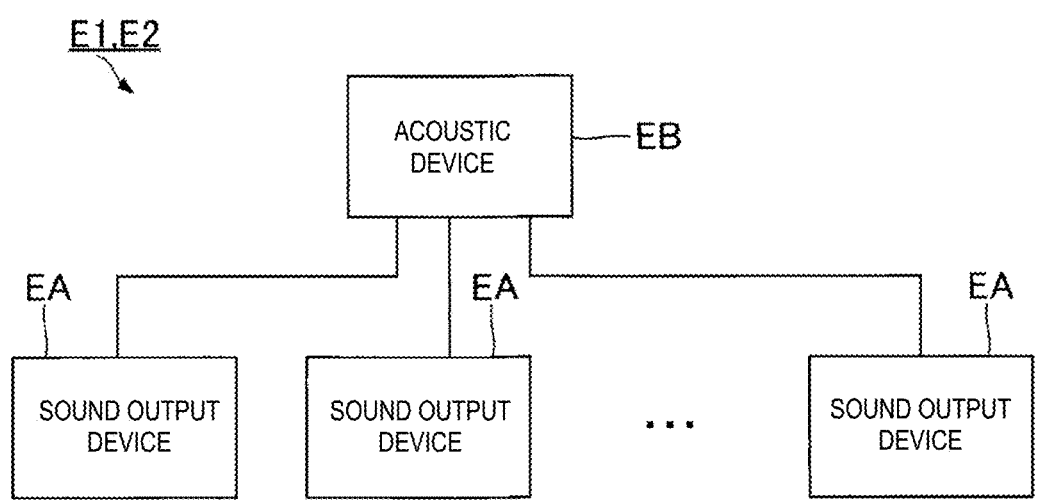
FIG. 2 is a block diagram showing a configuration of acoustic installations E1, E2.

A station S1 is provided with an acoustic installation E1, and B station S2 is provided with an acoustic installation E2. FIG. 2 is a block diagram showing a configuration of the acoustic installations E1, E2. Each of the acoustic installations E1, E2 includes at least one or more sound output devices (for example, a speaker device (speaker)) EA installed at different locations within a station yard, and an acoustic device EB that reproduces sound output from the sound output device EA. In the present embodiment, A station S1 and B station S2 are respectively provided with a plurality of the sound output devices EA. The acoustic installations E1, E2 output voice announcements within a station yard, for example.

In addition, the acoustic installations E1, E2 transmit authentication information that is set for each station within the station yard. In the present embodiment, the acoustic installations E1, E2 transmit the authentication information to areas within the station yard using acoustic communication, which uses, as the transmission medium, sound waves manifested as air vibrations. That is, the sound output device EA is installed in a facility and functions as a transmitter that transmits the authentication information to areas within the facility. The authentication information is, for example, a code that is set for each station. The authentication information is transmitted only within a specific range. For example, the authentication information of A station S1 is transmitted only within the premises of A station S1, and the authentication information of B station S2 is transmitted only within the premises of B station S2. Accordingly, for example, the user terminal 10-1 that could receive the authentication information of A station S1 is guaranteed to be located in the vicinity of A station S1. Accordingly, the authentication information is information for identifying the location from which the authentication information is to be transmitted.

An acoustic component of the authentication information is a component outside of the audible band. The acoustic installations E1, E2 transmit the authentication information together with the voice announcements described above, for example. In addition, the acoustic installations E1, E2 transmit the authentication information periodically. The same or different authentication information can be transmitted from a plurality of the sound output devices EA of one of the acoustic installations E1 or E2. In the present embodiment, the plurality of sound output devices EA of the acoustic installation E1 of A station S1 transmit the same authentication information (authentication information of A station S1). In addition, the plurality of sound output devices EA of the acoustic installation E2 of B station S2 transmit the same authentication information (authentication information of B station S2).

The staff terminal 20-1 is an information processing terminal held by staff C1 of A station S1. A staff terminal 20-2 is an information processing terminal held by staff C2 of B station S2. The terminals are, for example, smartphones, tablets, laptop computers, desktop computers, telephones, or the like. In the present embodiment, the staff terminals 20-1, 20-2 are tablets. The staff terminal 20-1 is disposed at a first staff base K1. The first staff base K1 can be provided in a remote location away from A station S1, or be provided within A station S1. For example, the first staff base K1 can be a station attendant's office inside A station S1. In addition, the staff terminal 20-2 is disposed at a second staff base K2. The second staff base K2 can be provided in a remote location away from B station S2, or be provided within B station S2. For example, the second staff base K2 can be a station attendant's office inside B station S2.

The staff C1 is a person related to A station S1. The staff C1 is preferably a person who can answer inquiries related to A station S1. The staff C1 is, for example, a station attendant of A station S1, an employee of a store inside A station S1, a manager of A station S1, a person commissioned by the manager of A station S1, an employee of a railway operator, or the like. In the first embodiment, the staff C1 is a station attendant of A station S1. Similarly, the staff C2 is a person related to B station S2.

Figure 3:
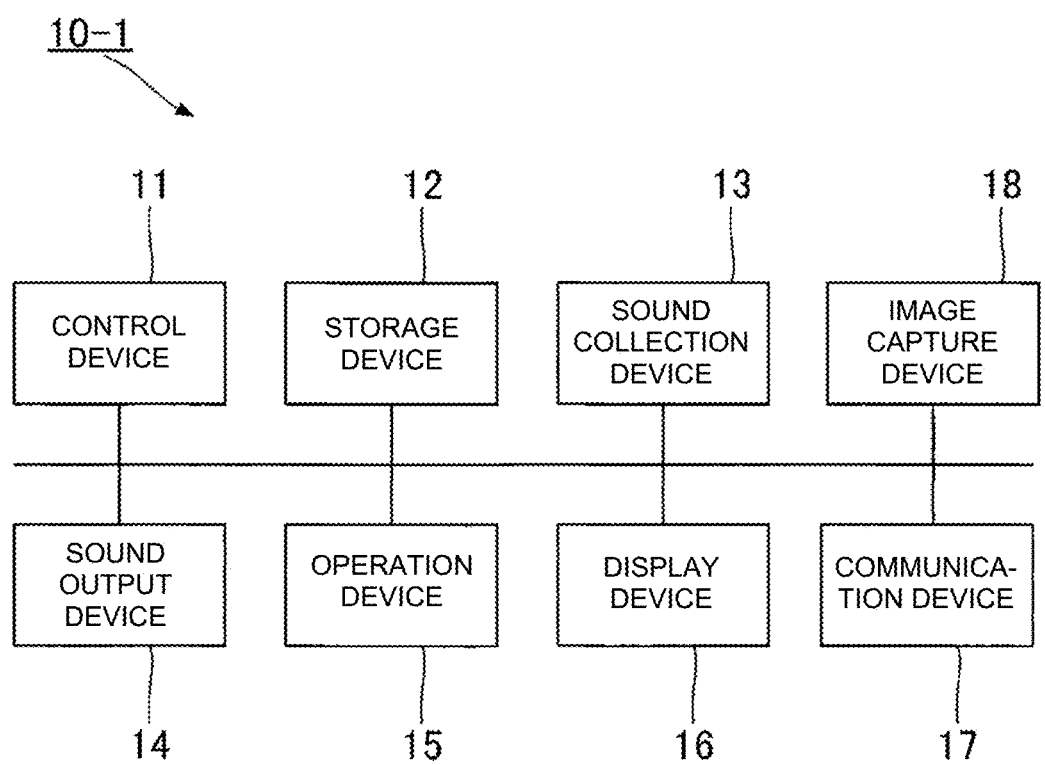
FIG. 3 is a block diagram showing a hardware configuration of a user terminal 10-1.

FIG. 3 is a block diagram showing a hardware configuration of the user terminal 10-1. The user terminal 10-2 also has a similar configuration. The user terminal 10-1 comprises a control device 11, a storage device 12, a sound collection device 13, a sound output device 14, an operation device 15, a display device 16, a communication device 17, and an image capture device 18.

The control device (electronic controller) 11 includes one or a plurality of processors that control each element of the user terminal 10-1. For example, the control device 11 includes one or more types of processors, such as a CPU (Central Processing Unit), an SPU (Sound Processing Unit), a DSP (Digital Signal Processor), an FPGA (Field Programmable Gate Array), an ASIC (Application Specific Integrated Circuit), etc. The term "electronic controller" as used herein refers to hardware that executes software programs.

The storage device 12 includes one or more memory units (computer memories) for storing a program that is executed by the control device 11. A known storage medium, such as a magnetic storage medium or a semiconductor storage medium, or a combination of a plurality of various types of storage media constitute the storage device 12. A portable storage medium that is attached to/detached from the user terminal 10-1 or a storage medium (for example, cloud storage) that the control device 11 can read from or write to via a communication network can also be used as the storage device 12.

In the present embodiment, programs stored in the storage device 12 include a program (guidance program) for providing a station guidance service. The guidance service is a service that conducts guidance of each station on a railway line, provided by a company that operates the railway that includes A station S1 as a stop. The guidance service can be used regardless of the location of the user U1. For example, the user U1 can use the guidance service from home to check a station guide map of a stop before boarding the train, or check a map of the area around the station after deboarding. In addition, the guidance service has a staff communication function that connects the user terminal 10-1 with the staff terminal 20-1 via the communication network N. By using the staff communication function, the user U1 and the station staff C1 can communicate in real time.

The sound collection device 13 detects surrounding sounds (air vibrations) and outputs the sounds as audio signals. The sound collection device 13 is, for example, a microphone. The sound collection device 13 that is separate from the user terminal 10-1 can be connected to the user terminal 10-1 wirelessly or by wire.

The sound output device 14 reproduces sound represented by the audio signal. The sound output device 14 is a speaker (loudspeaker) or headphones, for example. Illustrations of a D/A converter that converts the audio signal from digital to analog and of an amplifier that amplifies the audio signal have been omitted for the sake of convenience. The sound output device 14 that is separate from the user terminal 10-1 can be connected to the user terminal 10-1 wirelessly or by wire.

The operation device 15 is an input device (user operable input) that receives instructions from the user U1. For example, the operation device 15 is an operator operated by the user U1, or a touch panel that detects touch by the user U1. In the present embodiment, a touch panel T1 (refer to FIG. 8, etc.) is used as the operation device 15. In this case, the touch panel T1 serves both as the operation device 15 and as the display device 16, described further below. The operation device 15 (such as a mouse or a keyboard) that is separate from the user terminal 10-1 can be connected to the user terminal 10-1 wirelessly or by wire.

The display device (display) 16 displays images under the control of the control device 11. For example, various display panels such as a liquid-crystal display panel or an organic EL (Electroluminescent) display panel are employed as the display device 16. The display device 16 that is separate from the user terminal 10-1 can be connected to the user terminal 10-1 wirelessly or by wire.

The communication device 17 communicates with the staff terminal 20-1 via the communication network N. The image capture device 18 includes a light receiving optical system, such as a lens, imaging elements, etc., that convert the light collected by the light receiving optical system into an electrical signal, and generates a captured image obtained by photographing the periphery of the user terminal 10-1.

Figure 4:
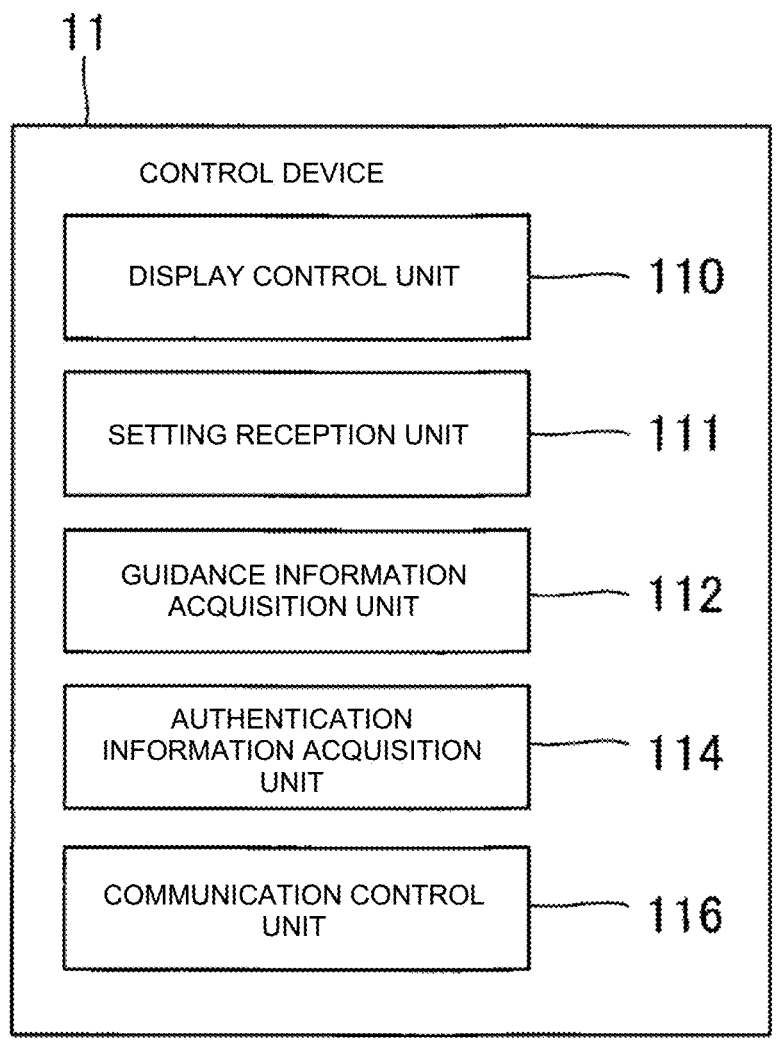
FIG. 4 is a block diagram showing a functional configuration of the user terminal 10-1.

FIG. 4 is a block diagram showing the functional configuration of the control device 11. The control device 11 executes the program described above to function as a display control unit 110, a setting reception unit 111, a guidance information acquisition unit 112, an authentication information acquisition unit 114, and a communication control unit 116.

The display control unit 110 controls the display of the touch panel T1. The setting reception unit 111 receives, from the user U1, various settings related to the guidance service. The guidance information acquisition unit 112 acquires the guidance information specified by the user U1 when the guidance service is executed. The authentication information acquisition unit 114 acquires the authentication information transmitted within the station yard. The communication control unit 116 controls the communication that uses the communication device 17. In the present embodiment, the communication control unit 116 controls the communication, which uses the communication device 17, between the user terminal 10-1 and the staff terminal 20-1.

Figure 5:
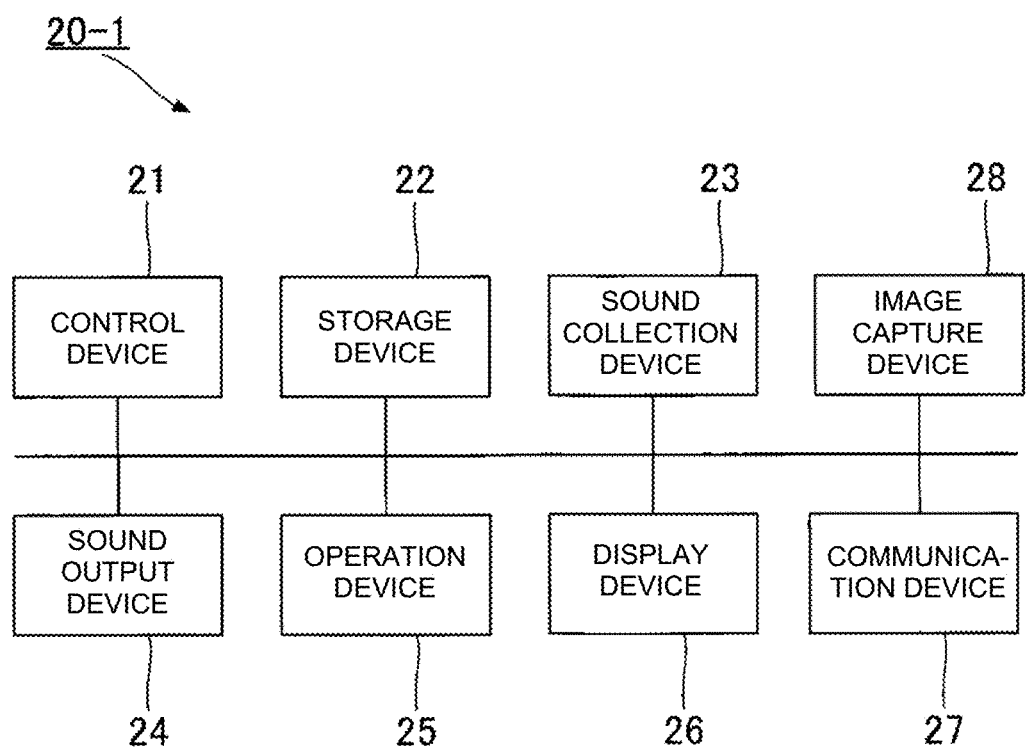
FIG. 5 is a block diagram showing a hardware configuration of a staff terminal 20-1.

FIG. 5 is a block diagram showing a hardware configuration of the staff terminal 20-1. The staff terminal 20-2 also has a similar configuration. The staff terminal 20-1 comprises a control device 21, a storage device 22, a sound collection device 23, a sound output device 24, an operation device 25, a display device 26, a communication device 27, and an image capture device 28.

The control device 21 (electronic controller) includes one or a plurality of processors that control each element of the staff terminal 20-1. For example, the control device 21 includes one or more types of processors, such as a CPU, an SPU, a DSP, an FPGA, an ASIC, and the like. The term "electronic controller" as used herein refers to hardware that executes software programs.

The storage device 22 includes one or more memory units (computer memories) for storing a program that is executed by the control device 21 and various data that are used by the control device 21. A known storage medium, such as a magnetic storage medium or a semiconductor storage medium, or a combination of a plurality of various types of storage media, constitute the storage device 22. A portable storage medium that is attached to/detached from the staff terminal 20-1 or a storage medium (for example, cloud storage) that the control device 21 can read from or write to via a communication network can also be used as the storage device 22.

In the present embodiment, programs stored in the storage device 22 include a program for executing communication with the user terminal 10-1 using the staff communication function of the guidance service.

The sound collection device 23 detects surrounding sounds (air vibrations) and outputs the sounds as audio signals. The sound collection device 23 is, for example, a microphone. The sound collection device 23 that is separate from the staff terminal 20-1 can be connected to the staff terminal 20-1 wirelessly or by wire.

The sound output device 24 reproduces sound represented by the audio signal. The sound output device 24 is a speaker (loudspeaker) or headphones, for example. Illustrations of a D/A converter that converts the audio signal from digital to analog and of an amplifier that amplifies the audio signal have been omitted for the sake of convenience. In addition, the sound collection device 24 that is separate from the staff terminal 20-1 can be connected to the staff terminal 20-1 wirelessly or by wire.

The operation device 25 is an input device (user operable input) that receives instructions from the staff C1. For example, the operation device 25 is an operator operated by the staff C1, or a touch panel that detects touch by the staff C1. In the present embodiment, a touch panel T2 (refer to FIG. 14, etc.) is used as the operation device 25. In this case, the touch panel T2 serves both as the operation device 25 and as the display device 26, described further below. The operation device 25 (such as a mouse or a keyboard) that is separate from the staff terminal 20-1 can be connected to the staff terminal 20-1 wirelessly or by wire.

The display device (display) 26 displays images under the control of the control device 21. For example, various display panels such as a liquid-crystal display panel or an organic EL (Electroluminescent) display panel are employed as the display device 26. In addition, the display device 26 that is separate from the staff terminal 20-1 can be connected to the staff terminal 20-1 wirelessly or by wire.

The communication device 27 communicates with the user terminal 10-1 via the communication network N. The image capture device 28 includes a light receiving optical system, such as a lens, imaging elements that convert the light collected by the light receiving optical system into an electrical signal, and the like, and generates a captured image obtained by photographing the periphery of the staff terminal 20-1.

Figure 6:
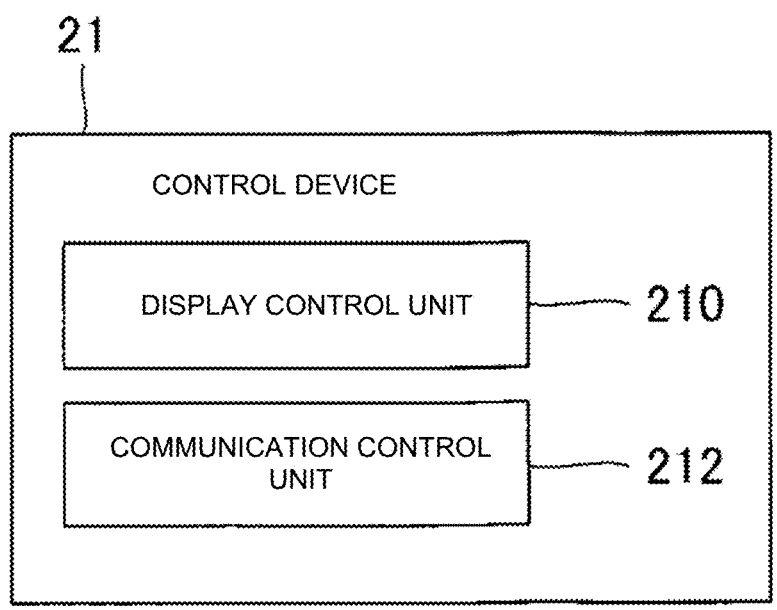
FIG. 6 is a block diagram showing a functional configuration of the staff terminal 20-1.

FIG. 6 is a block diagram showing the functional configuration of the control device 21. The control device 21 executes the program described above to function as a display control unit 210 and a communication control unit 212.

The display control unit 210 controls the display of the touch panel T2. The communication control unit 212 controls the communication that uses the communication device 27. In the present embodiment, the communication control unit 212 controls the communication, which uses the communication device 27, between the staff terminal 20-1 and the user terminal 10-1.

Details of the guidance service and the staff communication function will be described next. Communication between the staff terminal 20-1 and the user terminal 10-1 located in A station S1 will be mainly used as an example in the following description.

FIGS. 8-13 are diagrams showing display screens of the guidance service. When the user U1 activates the guidance service on the user terminal 10-1, the display control unit 110 displays a display screen SC1 shown in FIG. 8 on the touch panel T1. The display screen SC1 includes railway station name displays S1 (S11 to S15) and a settings button T1.

Figure 9:
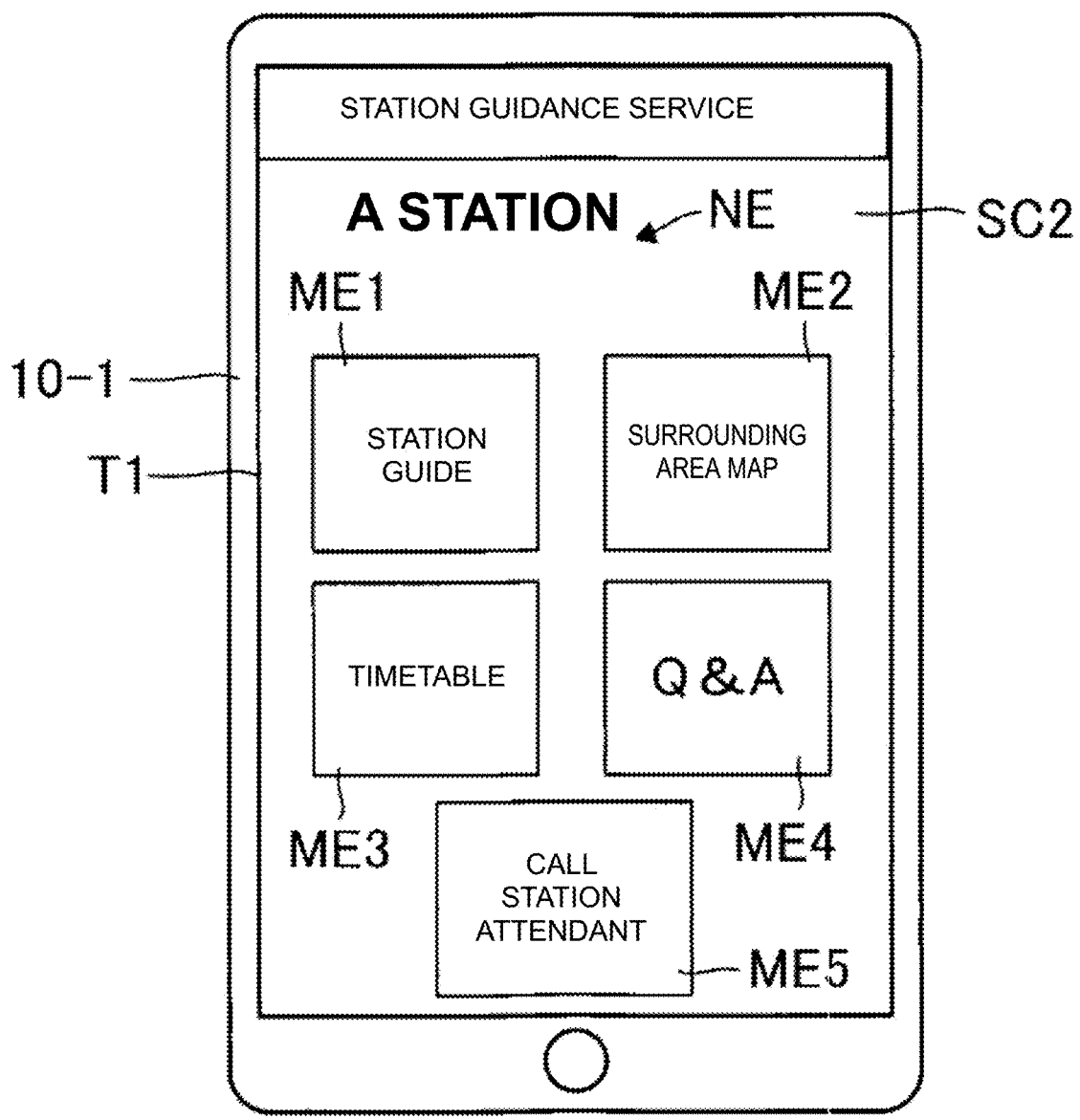
FIG. 9 is a diagram showing a display screen of the guidance service.

In the display screen SC1, if the user U1 taps on the station name display S1 of the station for which the user wishes to receive guidance, the display control unit 110 displays a display screen SC2 shown in FIG. 9 on the touch panel T1. The display screen SC2 is a screen that is displayed when the station name display S11 corresponding to A station S1 is tapped. A display screen SC2 includes a station name display NE indicating the name of the station for which guidance is to be provided, and a guidance menu ME (ME1 to ME5). The guidance menu ME includes a guidance button ME1, a map button ME2, a timetable button ME3, a Q&A button ME4, and a call button ME5.

When the guidance button ME1 is selected, the guidance information acquisition unit 112 acquires a station guide map (station premises guide map) of A station S1. The display control unit 110 displays, on the touch panel T1, the station guide map acquired by the guidance information acquisition unit 112. Similarly, when the map button ME2 is selected, the guidance information acquisition unit 112 acquires a map of the area surrounding A station S1, and the display control unit 110 displays the surrounding area map on the touch panel T1. When the timetable button ME3 is selected, the guidance information acquisition unit 112 acquires the timetable for A station S1, and the display control unit 110 displays the timetable on the touch panel T1.

When the Q&A button ME4 is selected, the guidance information acquisition unit 112 acquires a list of questions and answers relating to A station S1, and the display control unit 110 displays the questions and answers on the touch panel T1. The expected contents of the questions and answers are questions relating to facilities at A station S1, such as "Is there a diaper changing station?" The questions and answers is not limited to a format in which the user U1 selects a question that the user wants to refer to; for example, it can be in an interactive format, such as an artificial intelligence (AI) chatbot.

The station guide map, surrounding area map, the timetable, and the questions and answers, which are acquired by the guidance information acquisition unit 112, are referred to as "guidance information." The guidance information is information that changes relatively little. Thus, the guidance information can be stored in the storage device 12 as a part of data used in the guidance service, for example. In this case, the guidance information acquisition unit 112 reads the guidance information from the storage device 12. Alternatively, an information supply server (not shown) connected to the communication network N can be provided to store the guidance information. In this case, the guidance information acquisition unit 112 receives the guidance information from the information supply server.

When the call button ME5 is selected, the communication control unit 116 starts communication between the user terminal 10-1 and the staff terminal 20-1. That is, if the call button ME5 is selected, it becomes possible to call the station staff C1 and for the user U1 and the station staff C1 to communicate in real time. Hereinbelow, the function of communicating between the user terminal 10-1 and the staff terminal 20-1 is referred to as "staff communication function."

The staff communication function is expected to be used, for example, when the user U1 encounters trouble in the station yard, or when information sought by the user U1 could not be obtained even when referring to information that is displayed by selecting the guidance menus ME1-ME4. On the other hand, if the staff communication function is set to be always enabled, there is the possibility that the work of the staff C1 is disrupted due to prank calls or erroneous operations. Thus, the communication control unit 116 enables communication with the staff terminal 20-1 only when the user terminal 10-1 is located in A station S1.

The communication control unit 116 uses the authentication information acquired by the authentication information acquisition unit 114 to determine whether the user U1 is in A station S1. In the present embodiment, the authentication information acquisition unit 114 receives authentication information transmitted from the acoustic installation E1 using acoustic communication. More specifically, the authentication information acquisition unit 114 acquires an audio signal representing sound around the user terminal 10-1, collected with the sound collection device 13. If acoustic communication components are included in the audio signal, the authentication information acquisition unit 114 extracts the authentication information by performing prescribed signal processing on the audio signal. The communication range of the acoustic communication is the extent that the sound output from the acoustic installation E1 can reach. Thus, if the user terminal 10-1 is receiving authentication information corresponding to A station S1, it can be determined that the user terminal 10-1 and the user U1 are in A station S1. On the other hand, if the user terminal 10-1 is not receiving authentication information corresponding to A station S1, it can be determined that the user terminal 10-1 and the user U1 are not in A station S1.

By transmitting the authentication information using acoustic communication, the user U1 does not need to voluntarily acquire the authentication information, which improves the convenience for the user U1. It is particularly effective, for example, if the user U1 is unfamiliar with the operation of the user terminal 10-1, or if smooth movement within the station yard is difficult. An example of a case in which the user U1 voluntarily acquires authentication information is when an information code displayed in A station S1 is read using the image capture device 18 of the user terminal 10-1.

In addition, by using acoustic communication, it can be more precisely detected that the user terminal 10-1 is located in A station S1, compared to using location information of a Global Positioning System (GPS), for example. For example, station platforms generally are several tens of meters in length in the direction in which the tracks extend. Thus, there are cases in which the location information of the representative point of A station S1 does not match the location information of an end of a platform in A station S1, so that the user terminal 10-1 at the end of the platform cannot be recognized as being located in A station S1. In contrast, if authentication information is transmitted from the sound output device EA installed at various locations on the platform of A station S1, the authentication information can be received by the user terminal 10-1 that is located at the end of the platform, so that the user terminal 10-1 can be detected as being located in A station.

Figure 7:
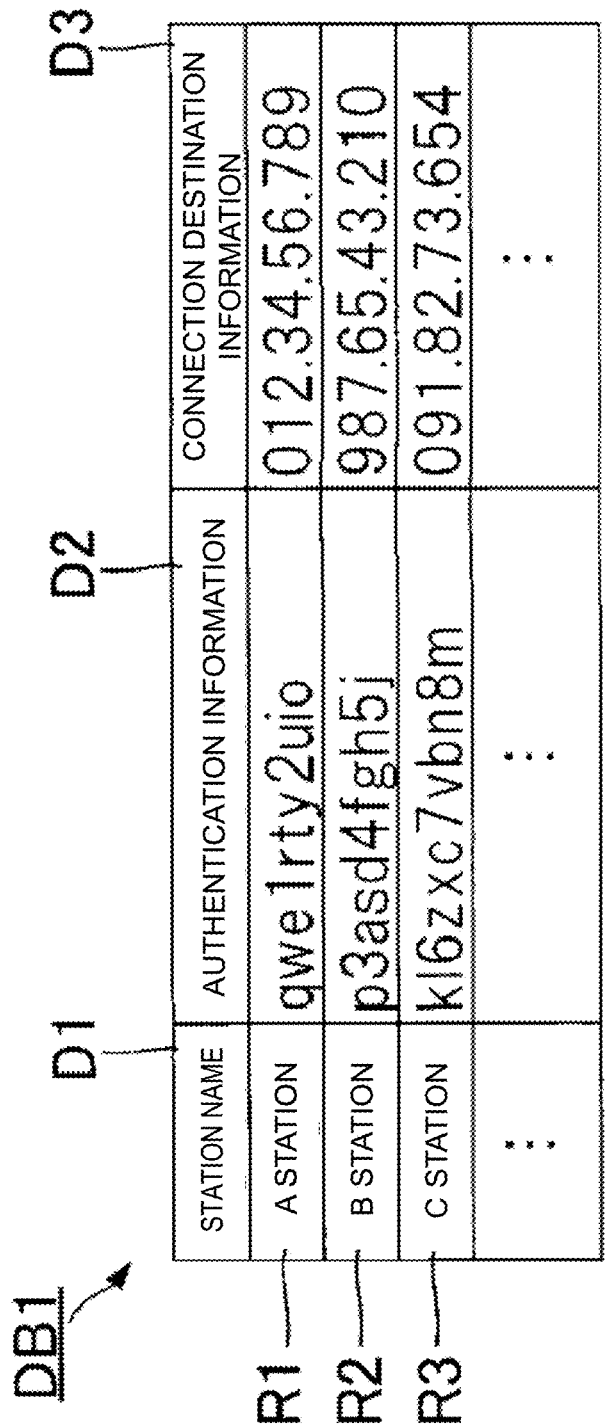
FIG. 7 is a diagram showing one example of an authentication information database DB1.

FIG. 7 is a diagram showing one example of the authentication information database DB1. The authentication information database DB1 is stored in the storage device 12. The authentication information database DB1 can be included in the guidance program in advance, for example. In addition, the authentication information database DB1 can be acquired from an authentication information supply server (not shown), triggered by the acquisition of the authentication information or in response to an instruction from the user U1.

The authentication information database DB1 contains records R (R1-R3), including station name information D1, authentication information D2, and connection destination information D3. The station name information D1 indicates the station name, which is an identifier of the facility. The authentication information D2 is a code set for each station. The connection destination information D3 is an address for identifying the staff terminals 20-1, 20-2 of each station on the communication network N. The connection destination information D3 can be, for example, an IP address, or a telephone number if the staff terminals 20-1, 20-2 are telephones.

As shown in FIG. 7, the authentication information D2 is different for each location (station) to which the authentication information is transmitted. In addition, staff terminals are provided corresponding to the stations, respectively, each having different connection destination information D3. The user terminal 10-1 can receive the authentication information to identify the staff terminal 20-1 corresponding to A station S1 from among a plurality of staff terminals. That is, the user terminal 10-1 identifies the terminal device that is connected as the staff terminal, on the basis of the authentication information.

The authentication information D2 can be updated at prescribed time intervals. This is to prevent the user terminal 10-1 that has visited A station S1 in the past from repeatedly using the authentication information of A station S1 and activating the staff communication function, even after leaving A station S1.

The communication control unit 116 determines whether the authentication information acquired by the authentication information acquisition unit 114 matches the authentication information D2 of any one of the records R in the authentication information database DB1. If the authentication information acquired by the authentication information acquisition unit 114 matches the authentication information D2 of any one of the records R, the communication control unit 116 determines whether the station name indicated by the station name information D1 of said record R matches the station name of the station selected on the guidance service. If the station names match, the communication control unit 116 enables the staff communication function with respect to the staff of said station. If the station names do not match, or if authentication information cannot be acquired, the communication control unit 116 disables the staff communication function with respect to the staff of the station.

For example, if the user terminal 10-1 cannot acquire the authentication information of A station S1, the communication control unit 116 disables the staff communication function with respect to the staff C1 of A station S1. The display control unit 110 grays out the call button ME5, for example, as in the display screen SC3 shown in FIG. 10. The user U1 can recognize that the staff communication function with respect to the staff C1 of A station S1 is disabled from the fact that the call button ME5 is grayed out. In this case, even if the user U1 taps the call button ME5, the staff communication function is not activated.

The method of notifying that the staff communication function is disabled is not limited to graying out the call button ME5. For example, an error message such as "this function cannot be used outside of A station" can be displayed at the timing at which, or after, the user U1 selects the call button ME5, or at the timing at which the user U1 instructs the start of communication.

On the other hand, if the user terminal 10-1 can acquire the authentication information of A station S1, the communication control unit 116 enables the staff communication function with respect to the staff C1 of A station S1. The display control unit 110 displays, without graying out, the call button ME5, in the same way as the other guidance menus ME1-ME4. The user U1 can recognize that the staff communication function is enabled from the fact that the call button ME5 is displayed in the same way as the other guidance menus ME1-ME4. When the user U1 taps the call button ME5, the staff communication function is activated.

When the staff communication function is activated, the display control unit 110 displays a user interface corresponding to the communication mode pre-specified by the user U1. A communication mode is the language and method used when the user U1 communicates with the staff C1, for example. The communication mode can be specified by selecting the settings button T1 of the display screen SC1 shown in FIG. 8, for example.

Figure 8:
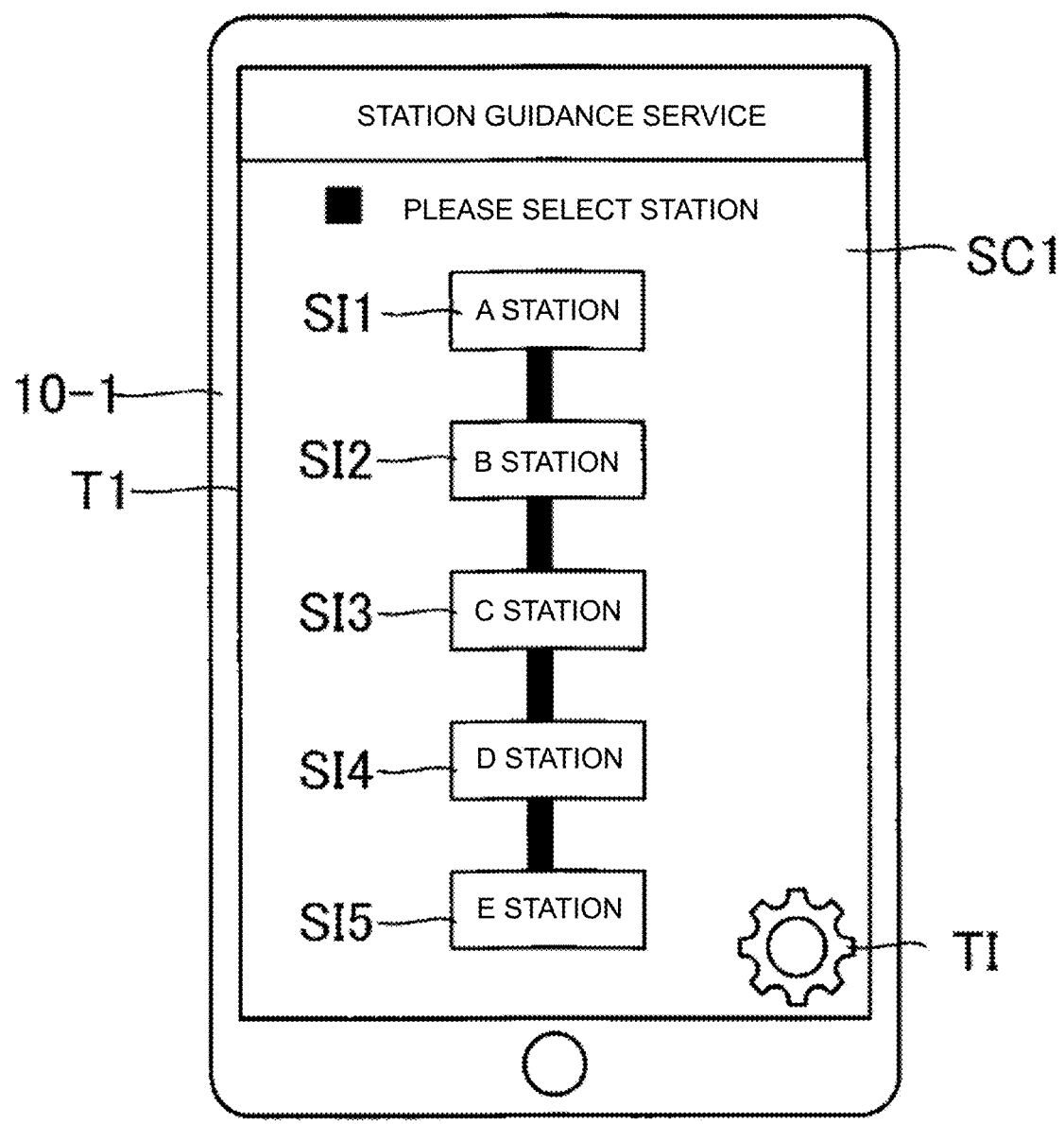
FIG. 8 is a diagram showing a display screen of a guidance service.
Figure 11:
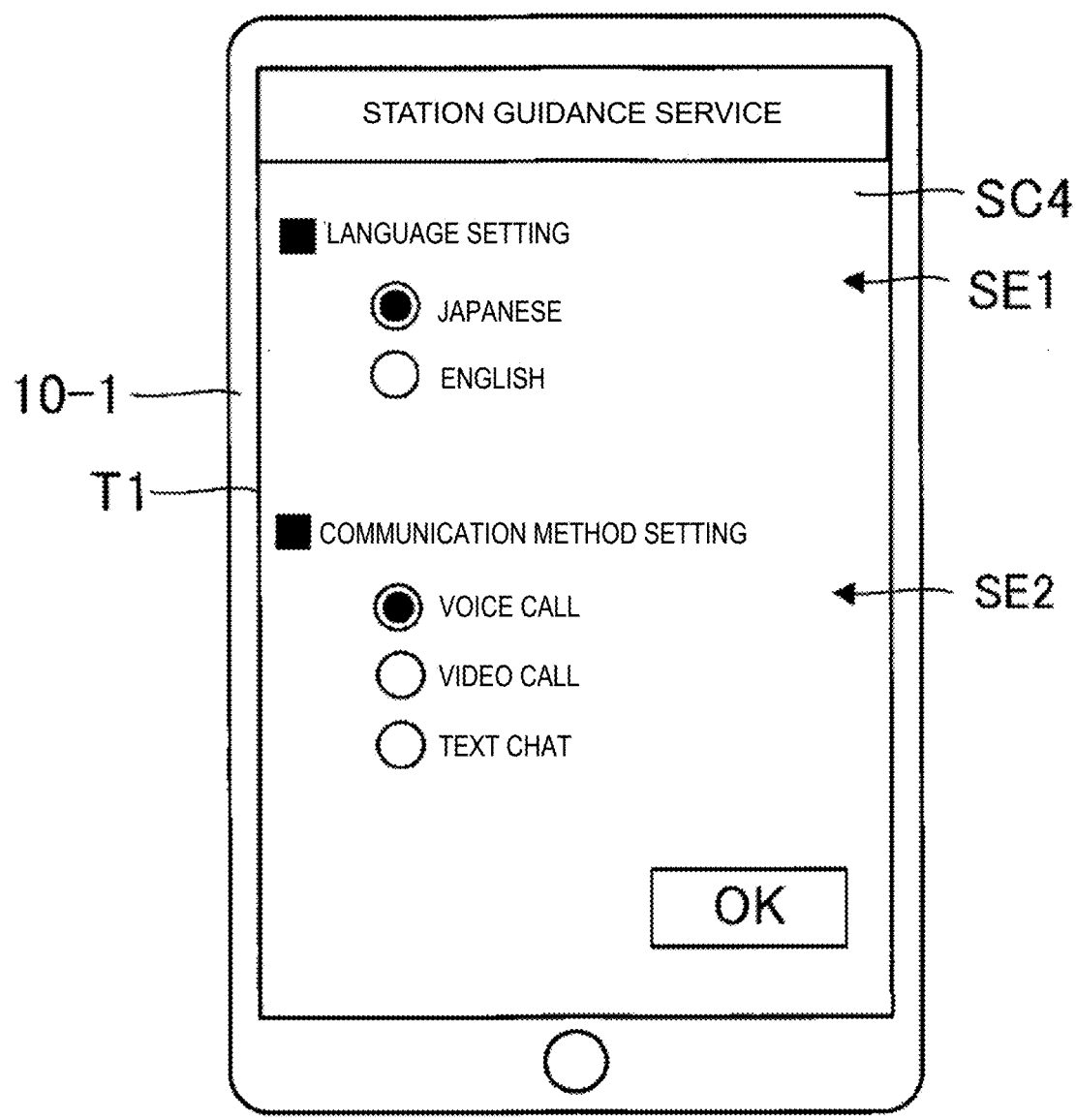
FIG. 11 is a diagram showing a display screen of the guidance service.

When the settings button T1 of the display screen SC1 shown in FIG. 8 is selected, the display control unit 110 displays a settings screen SC4 shown in FIG. 11. The settings screen SC4 includes a language setting display SE1 and a communication method setting display SE2. In the present embodiment, the user U1 is able to specify Japanese or English as the language. The user U1 can select either the Japanese or English radio button in the language setting display SE1 to specify the language. The setting reception unit 111 receives the language setting specified by the user U1. That is, the setting reception unit 111 receives, from the user U1, a selection of the language to be used in the communication with the staff terminal 20-1.

The language can be automatically identified on the basis of the language specified in the operating system of the user terminal 10-1, for example, instead of specifying the language on the guidance service. In addition, if English is selected in the language setting display SE1, the characters displayed on the guidance service, such as the guidance menus ME1-ME5 of the display screen SC2 shown in FIG. 9, can be switched to English.

Additionally, in the present embodiment, the user U1 can select either voice call, video call, or text chat as the communication method. The user U1 can select either the voice call, the video call, or the text chat radio button in the communication method setting display SE2 to specify the communication method. The setting reception unit 111 receives the communication method setting specified by the user U1.

Figure 12:
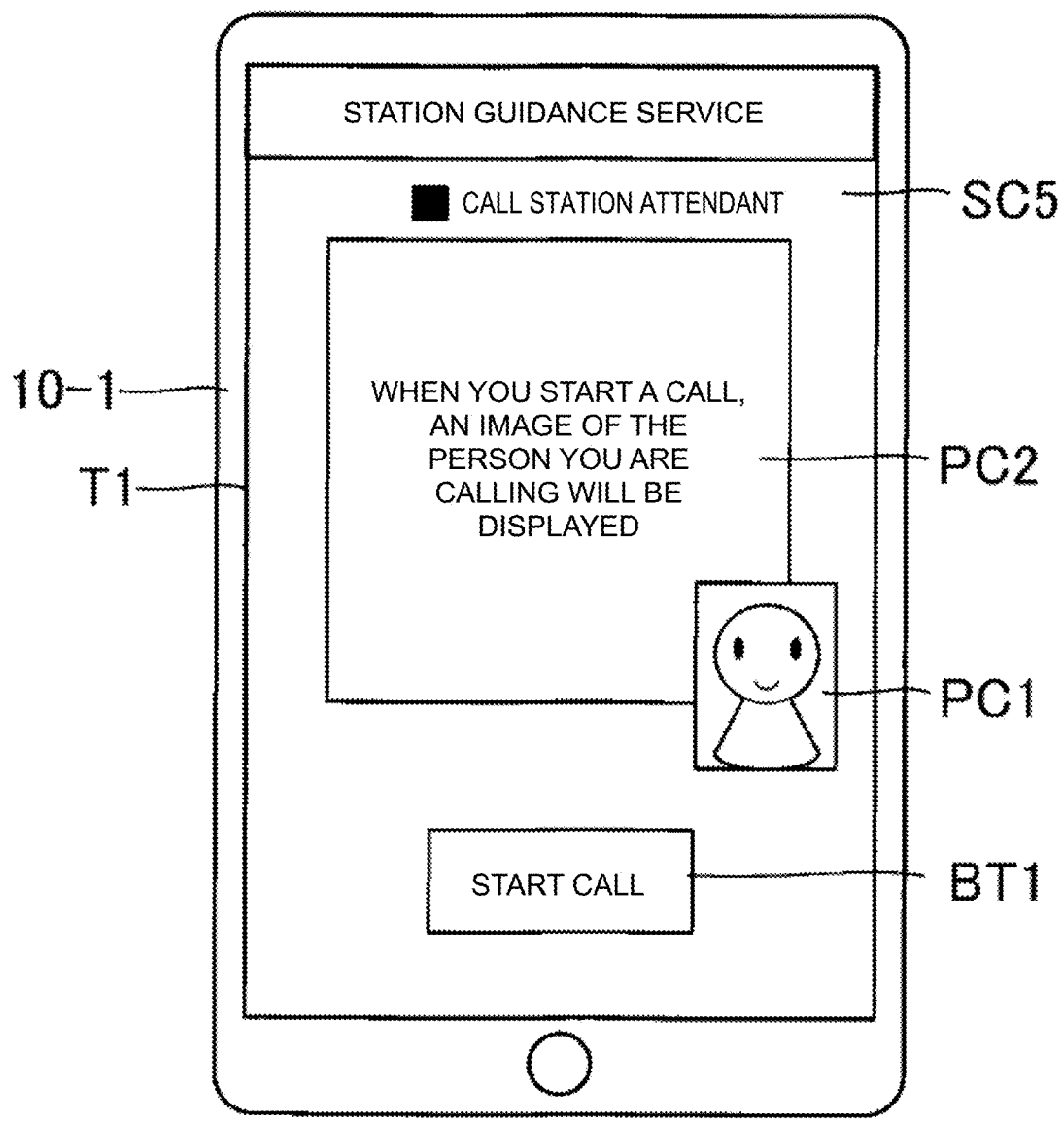
FIG. 12 is a diagram showing a display screen of the guidance service.

For example, if video call is selected as the communication method, when the staff communication function is activated, the display control unit 110 displays a display screen SC5 shown in FIG. 12. The display screen SC5 includes a user image PC1, which is a captured image obtained by photographing the user U1, a display area PC2 in which an image of the staff C1, who is the call destination, is displayed, and a call start button BT1. The user image PC1 is photographed using the image capture device 18 of the user terminal 10-1. When the call start button BT1 is touched, the communication control unit 116 transmits a connection request to the transmission destination indicated by the connection destination information D3 of a record R1 corresponding to A station S1, from among the authentication information database DB1 shown in FIG. 7. The connection destination information D3 of the record R1 is the address of the staff terminal 20-1.

A connection request is information transmitted from one terminal to another terminal when starting communication between the terminals. If the other terminal accepts the connection request, communication between the terminals becomes possible. The connection request can include terminal identification information for identifying the user terminal 10-1, for example. By displaying the terminal identification information on the staff terminal 20-1, the staff C1 is able to reject a connection request from a user that repeatedly makes prank calls, for example. In addition, the connection request can also include information indicating the communication method specified in the user terminal 10-1. As a result, it becomes possible to display, on the staff terminal 20-1, an interface suited for said communication method, and for the staff C1 to make preparations in accordance with the communication method.

If voice call is selected as the communication method, when the staff communication function is activated, the display control unit 110 displays the call start button BT1 on the touch panel T1. In addition, if text chat is selected as the communication method, when the staff communication function is activated, the display control unit 110 displays a text input area, a software keyboard, and a send button on the touch panel T1. When the user U1 touches the send button after inputting text, the communication control unit 116 transmits a connection request with respect to the connection destination information D3 of record R1. Note that voice input or handwritten input (written communication) can also be presented as options other than the software keyboard.

In addition, sign language can be specified as the language type. If sign language is selected as the language type, video call can be automatically selected as the communication method.

Figure 14:
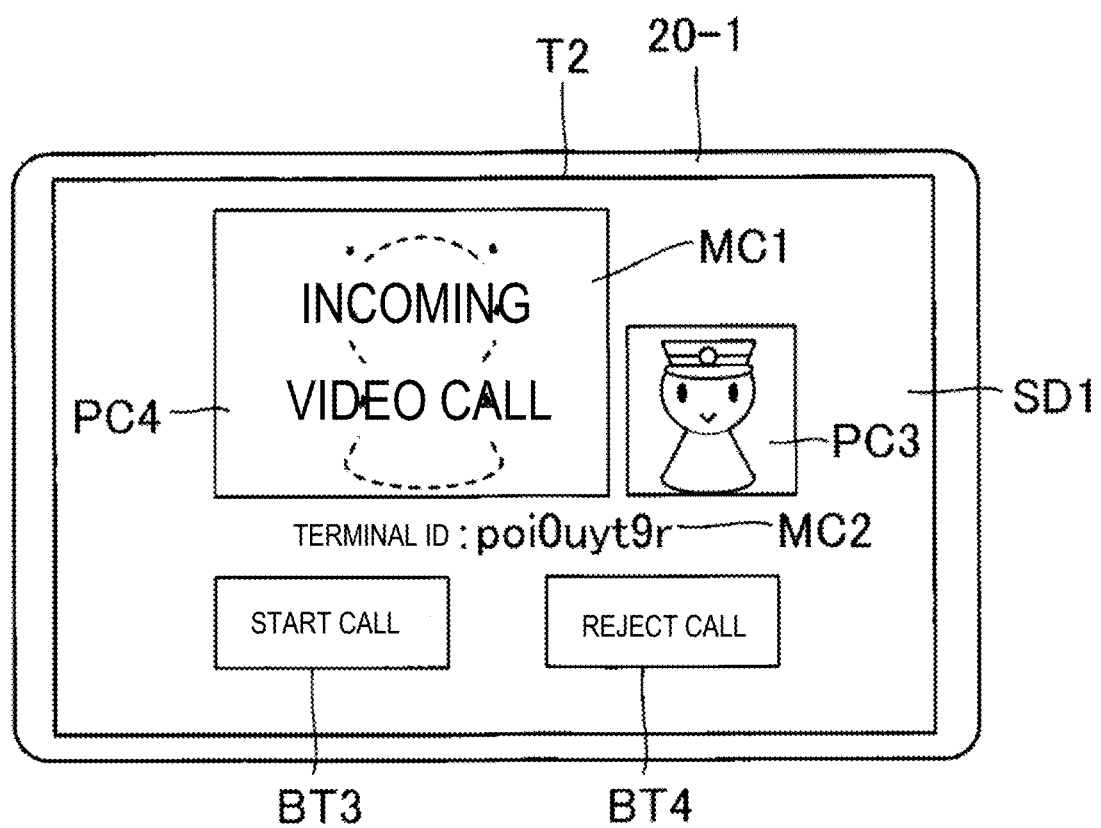
FIG. 14 is a diagram showing a display screen of the staff terminal 20-1.

FIG. 14 is a diagram showing the display screen of the staff terminal 20-1. When a connection request from the user terminal 10-1 is received, the display control unit 210 of the staff terminal 20-1 displays a display screen SD1 shown in FIG. 14 on the touch panel T2. The display screen SD1 includes a message MC1 indicating there is an (incoming) video call from the user terminal 10-1, a terminal identifier MC2 of the user terminal 10-1, a staff image PC3, which is a captured image obtained by photographing the staff C1, a display area PC4 in which an image of the user U1, who is the call destination, is displayed, a start call button BT3, and a reject call button BT4. The staff image PC3 is photographed using the image capture device 28. When the staff C1 touches the call start button BT3, the connection request is accepted, and the communication control unit 212 starts communication with the user terminal 10-1. As a result, communication between the user U1 and the staff C1 becomes possible.

Figure 13:
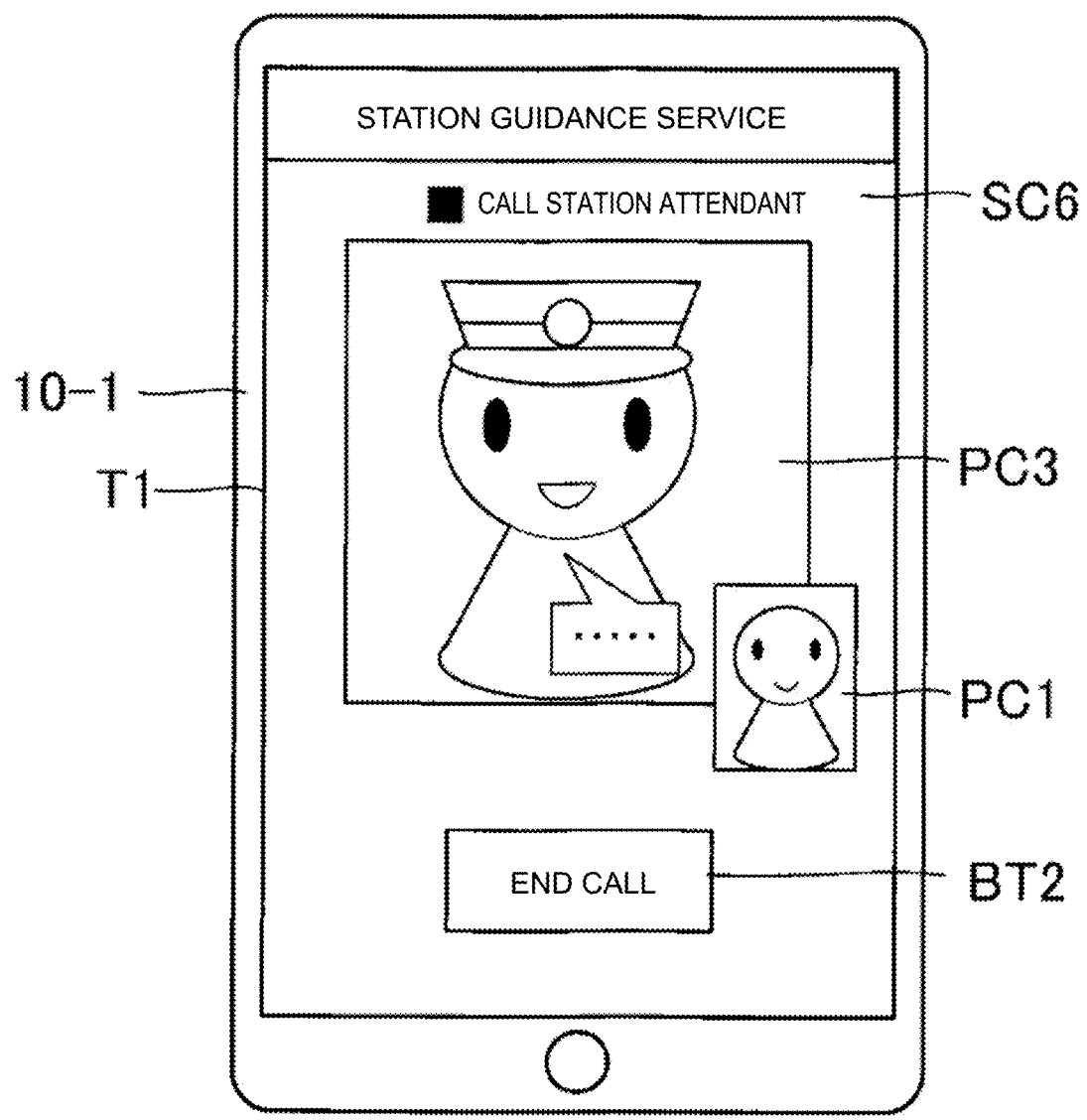
FIG. 13 is a diagram showing a display screen of the guidance service.

When the staff C1 touches the call start button BT3, a display screen SC6 shown in FIG. 13 is displayed on the touch panel T1 of the user terminal 10-1. The display screen SC6 includes the user image PC1, the staff image PC3 obtained by photographing the staff C1, and a call end button BT2. The user U1 can converse with the staff C1 while referring to the staff image PC3. During the conversation between the user U1 and the staff C1, voice uttered by the user U1 is collected by the sound collection device 13 of the user terminal 10-1 and output from the sound output device 24 of the staff terminal 20-1. In addition, voice uttered by the staff C1 is collected by the sound collection device 23 of the staff terminal 20-1 and output from the sound output device 14 of the user terminal 10-1. When the call end button BT2 is touched, or, when the call is ended from the staff terminal 20-1 side, the communication control unit 116 ends the communication with the staff terminal 20-1.

If the staff C1 touches the reject call button BT4 in the display screen SD1 shown in FIG. 14, communication with the user terminal 10-1 is not started, and a message such as "call has been rejected" is displayed on the user terminal 10-1.

As described above, in the communication system 1, the sound output device EA of the acoustic installation E1 transmits authentication information to areas within A station S1. The communication control unit 212 of the staff terminal 20-1 starts communication between the user terminal 10-1 and the staff terminal 20-1 held by the staff C1 of A station S1, in response to a connection request transmitted from the user terminal 10-1, which has received the authentication information transmitted by the acoustic installation E1.

In addition, the setting reception unit 111 receives, from the user U1, specification of the communication mode to be used in the communication with the staff terminal 20-1. In the communication between the staff terminal 20-1 and the user terminal 10-1, the display control units 110 and 210 activate user interfaces (for example, the display screen SC5 shown in FIG. 12 and the display screen SD1 shown in FIG. 14) corresponding to the communication mode specified by the user U1 on the staff terminal 20-1 and the user terminal 10-1.

Figure 15:
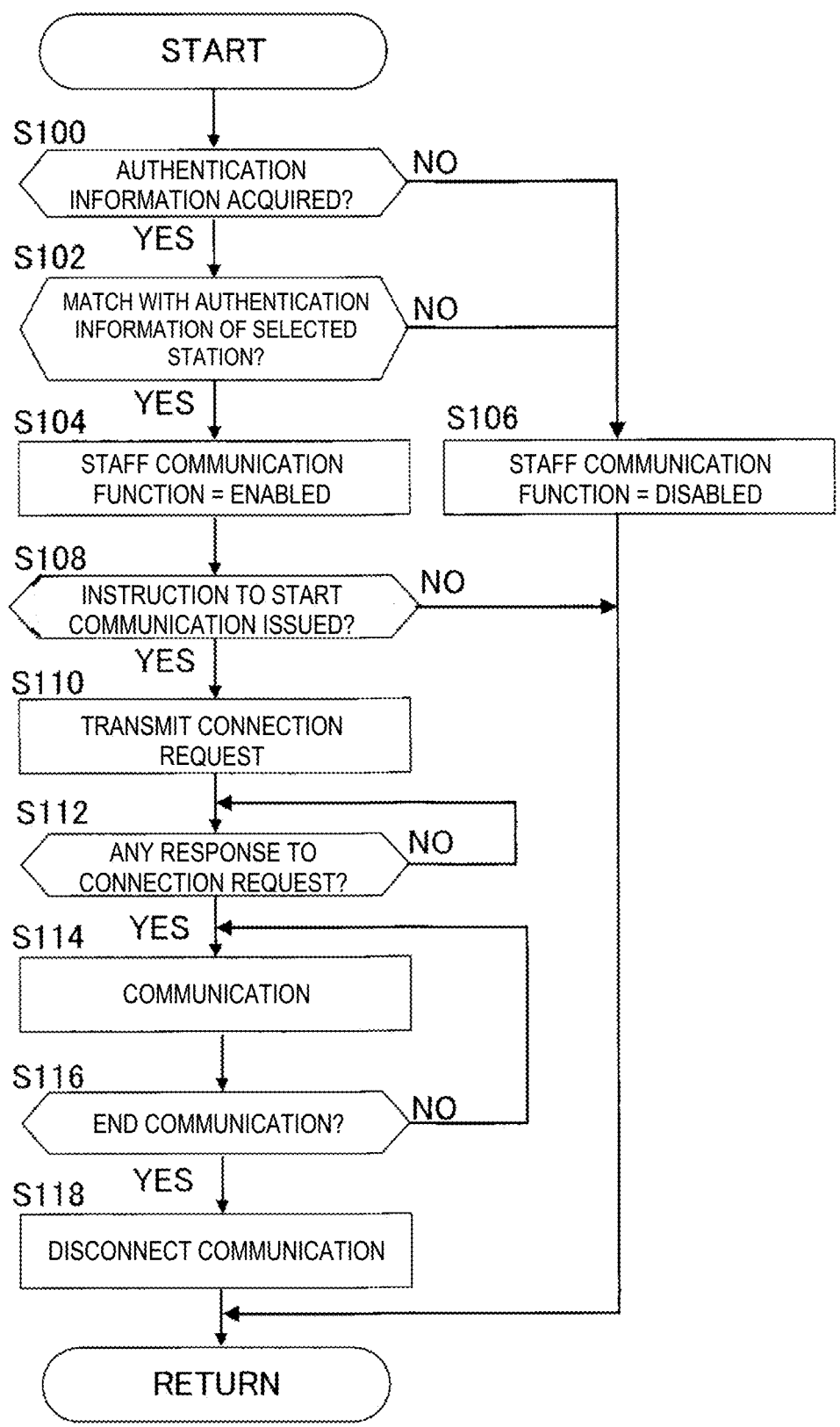
FIG. 15 is a flowchart showing a specific procedure by which a control device 11 executes a staff communication function of the guidance service.

FIG. 15 is a flowchart showing a specific procedure by which the control device 11 executes the staff communication function of the guidance service. For example, the guidance service is activated, triggered by an instruction from the user U1 to the operation device 15. In parallel with the process of FIG. 15, the control device 11 also executes processes other than the staff communication function of the guidance service. That is, the control device 11 (guidance information acquisition unit 112) acquires the guidance information specified by the user U1. In addition, the control device 11 (display control unit 110) displays the acquired guidance information on the touch panel T1.

During activation of the guidance service, the control device 11 (authentication information acquisition unit 114) determines whether authentication information transmitted using acoustic communication has been acquired (step S100). Acquiring authentication information corresponds to receiving some information through acoustic communication, and the information matching the authentication information D2 of any one of the records R in the authentication information database DB1.

If authentication information is acquired (step S100: YES), the control device 11 (communication control unit 116) determines whether the acquired authentication information and the authentication information of the station currently selected on the guidance service match (step S102). Specifically, the control device 11 (communication control unit 116) determines whether the station name, which is indicated by the station name information D1 of the record R having the authentication information D2 that matches the acquired authentication information, matches the station name of the station that is currently selected on the guidance service.

If the authentication information matches (step S102: YES), the control device 11 (communication control unit 116) enables the staff communication function with respect to the station (step S104). In this case, the display control unit 110 displays the call button ME5 for the selected station in the same way as the other guidance menus ME1-ME4, as shown in FIG. 9.

Figure 10:
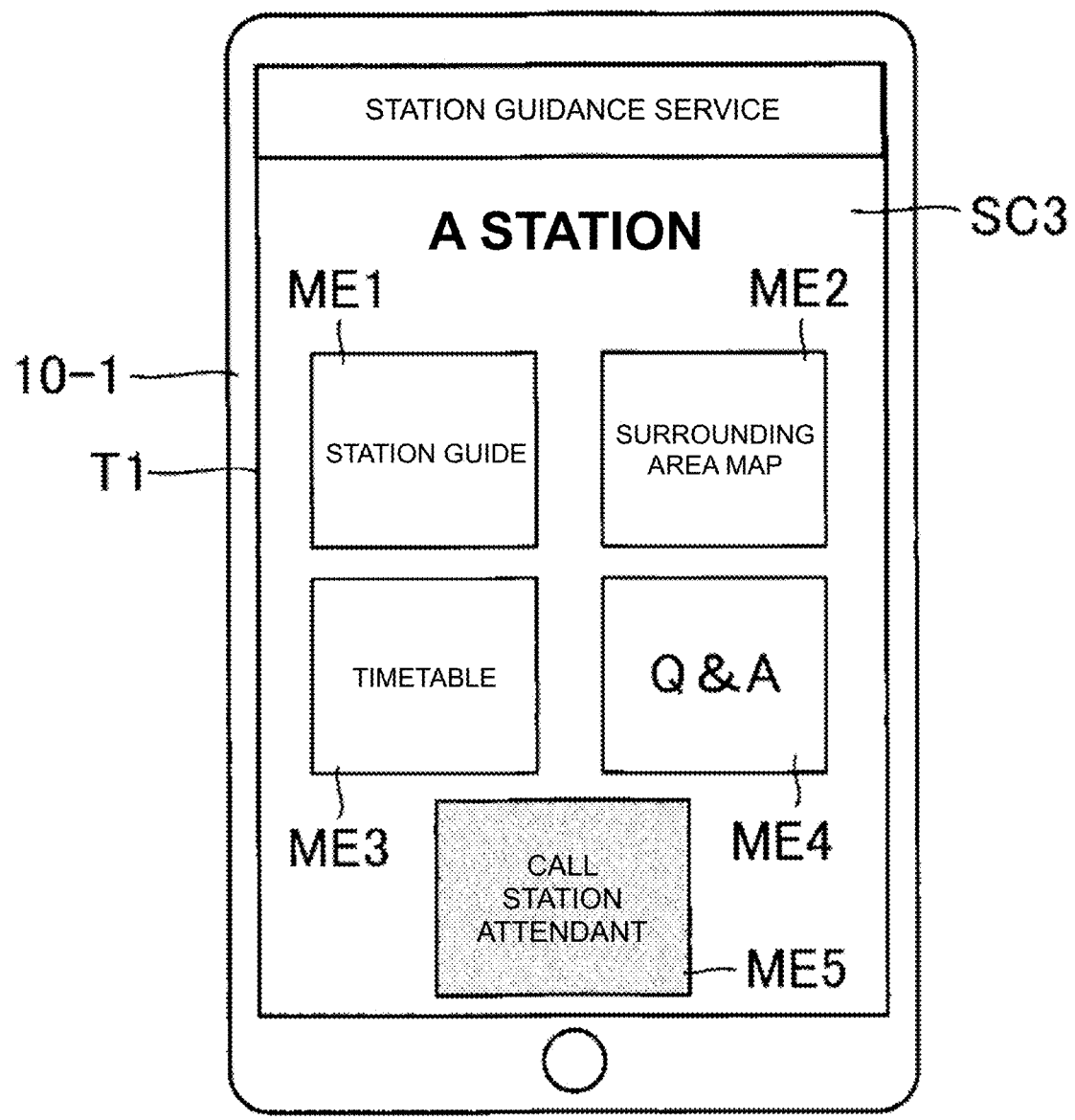
FIG. 10 is a diagram showing a display screen of the guidance service.

On the other hand, if the authentication information does not match (step S102: NO), or if authentication information could not be acquired in step S100 (step S100: NO), the control device 11 (communication control unit 116) disables the staff communication function with respect to said station (step S106). In this case, the display control unit 110 grays out the call button ME5, as shown in FIG. 10.

If the staff communication function is enabled in step S104, when there is an instruction from the user U1 to start communication with the staff terminal 20-1 (step S108: YES), the control device 11 (communication control unit 116) transmits a connection request to the staff terminal 20-1 (step S110). The control device 11 (communication control unit 116) waits until the staff terminal 20-1 responds to the connection request (step S112: NO), and, when the staff terminal 20-1 responds to the connection request (step S112: YES), carries out communication with the staff terminal 20-1 (step S114). If there is no response from the staff terminal 20-1 for a prescribed period of time or more, the control device 11 (communication control unit 116 and display control unit 110) can cancel the connection request and display a message, such as "No response," on the touch panel T1.

Until there is an instruction to end the communication from the user U1 or the staff terminal 20-1 (step S116: NO), the control device 11 (communication control unit 116) returns to step S114 and continues the communication. When there is an instruction to end the communication from the user U1 or the staff terminal 20-1 (step S116: YES), the control device 11 (communication control unit 116) ends the communication with the staff terminal 20-1 (step S118), and returns the process to step S100. The control device 11 also returns the process to step S100 if there is no instruction to start communication from the user U1 in step S108 (step S108: NO).

The process of step S102 can be omitted. For example, when the authentication information is received (step S100: YES), the control device 11 (communication control unit 116 and display control unit 110) enables the staff communication function (step S104) and displays a communication start button on the touch panel T1. This communication start button is a button for starting communication with a staff terminal corresponding to the authentication information received by the user terminal 10-1. For example, even if the user U1 in A station S1 is looking at information relating to B station S2 on the guidance service, when the communication start button is tapped (step S108: YES), a connection request is transmitted to the staff terminal 20-1 of A station S1 (step S110).

As described above, in the first embodiment, authentication information is transmitted from the acoustic installation E1 of A station S1, so, compared with displaying the authentication information at a specific location within A station S1, the user U1 can easily obtain the authentication information and easily communicate with the staff C1. In addition, in the first embodiment, the staff terminal 20-1 starts communication in response to a connection request from the user terminal 10-1 that has received the authentication information. Thus, communication is not started from the user terminal 10-1 that has not received the authentication information, that is, the user terminal 10-1 that is not located in the facility. Thus, it is possible to prevent malicious prank communications as well as unintentional erroneous communications.

Additionally, in the first embodiment, the staff terminal 20-1 is identified on the basis of the location of the user terminal 10. That is, if the user terminal 10-1 is located in A station S1, the staff terminal 20-1 corresponding to A station S1 becomes the connection destination of communication, and if the user terminal 10-1 is located in B station, the staff terminal 20-2 becomes the connection destination of communication. As a result, the user is more likely to be able to obtain the necessary information in a short period of time, which improves the user's convenience.

In addition, in the first embodiment, the user interface of the communication mode specified by the user U1 is activated in the staff communication function. As a result, the user U1 can smoothly communicate with the staff C1 in the mode specified by the user themselves.

B: Second Embodiment

The second embodiment will be described. In each of the embodiments illustrated below, elements that have the same functions as those in the first Embodiment have been assigned the same reference symbols used to describe the first Embodiment and detailed descriptions thereof have been appropriately omitted.

In the first embodiment, the user terminals 10-1, 10-2 and the staff terminals 20-1, 20-2 connect to each other in a one-to-one manner. That is, the staff terminal 20-1 is specified as the connection destination of the user terminal 10-1 located in A station S1 and the staff terminal 20-2 is specified as the connection destination of the user terminal 10-2 located in B station S2. In the second embodiment, a case is described in which the connection destination of the user terminal 10-1 located in A station S1 and the connection destination of the user terminal 10-2 located in B station S2 are both the staff terminal 20-1.

Figure 16:
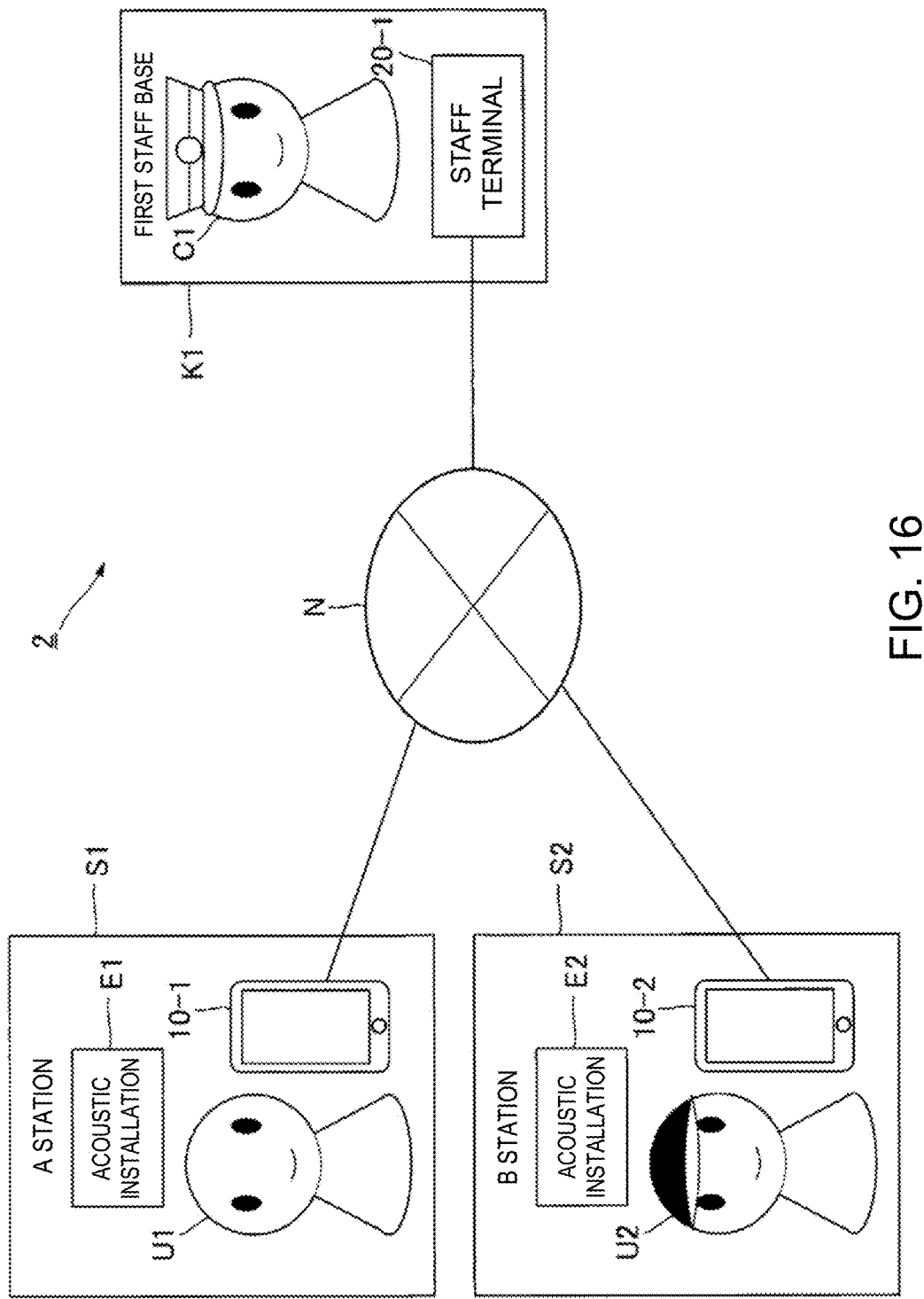
FIG. 16 is a diagram showing a configuration of a communication system 2 according to a second embodiment.

FIG. 16 is a diagram showing a configuration of a communication system 2 according to the second embodiment. The communication system 2 is only provided with the first staff base K1 as the staff base corresponding to A station S1 and B station S2. In the second embodiment, the staff C1 is a person related to A station S1 and B station S2. In the second embodiment, the staff C1 is an employee of a railway operator.

FIG. 17 is a diagram showing one example of an authentication information database DB2 of the second embodiment. The authentication information database DB2 is stored in the storage device 12. In the authentication information database DB2, the connection destination information D3 of the record R1 corresponding to A station S1 and the connection destination information D3 of a record R2 corresponding to B station S2 are the same. This connection destination information D3 is the address of the staff terminal 20-1. Thus, the connection destination when the staff communication function is used in the user terminal 10-1 located in A station S1 and the connection destination when the staff communication function is used in the user terminal 10-2 located in B station S2 are the same staff terminal 20-1.

In the second embodiment, A station S1 is one example of a first facility, the sound output device EA of the acoustic installation E1 is one example of a first transmitter, and the authentication information D2 of the record R1 of the authentication information database DB2 shown in FIG. 17 is one example of first authentication information. In addition, B station S2 is one example of a second facility, the sound output device EA of the acoustic installation E2 is one example of a second transmitter, and the authentication information D2 of the record R2 of the authentication information database DB2 is one example of second authentication information.

That is, in the second embodiment, the communication control unit 212 of the staff terminal 20-1 starts communication between the user terminal 10-1 and the staff terminal 20-1 related to A station S1 and B station S2, in response to a connection request transmitted from the user terminal 10-1 that has received the authentication information of A station S1 transmitted by the acoustic installation E1. In addition, the communication control unit 212 starts communication between the user terminal 10-2 and the staff terminal 20-1, in response to a connection request transmitted from the user terminal 10-2 that has received the authentication information transmitted by the acoustic installation E2.

In the second embodiment, the connection requests transmitted from the user terminals 10-1, 10-2 to the staff terminal 20-1 can include, in addition to terminal identification information, location information indicating the locations of the user terminals 10-1, 10-2. The reason for including location information in the connection request is to facilitate identification of the origin of communication by the staff C1. Identifying the origin of communication before starting the communication allows smooth handling of inquiries from the users U1, U2. The location information included in the connection request can be authentication information received by the user terminals 10-1, 10-2, for example. By storing a table in which authentication information is associated with the names of stations from which the authentication information is transmitted in the storage device 22 of the staff terminal 20-1, the staff terminal 20-1 is able to identify the name of the stations where the user terminals 10-1, 10-2 are located, on the basis of the authentication information included in the connection request. The table described above can be the authentication information database DB2.

Figure 18:
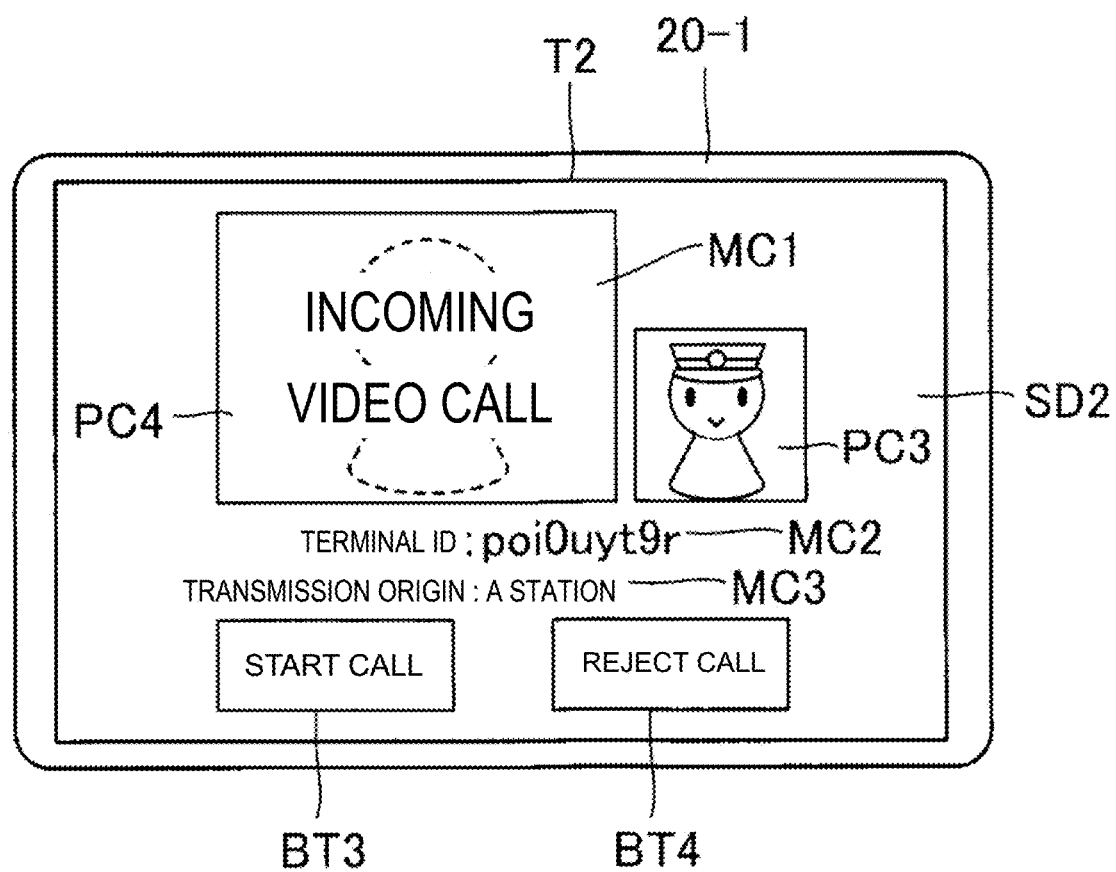
FIG. 18 is a diagram showing a display screen of the staff terminal 20-1.

FIG. 18 is a diagram showing a display screen of the staff terminal 20-1. For example, if the user terminal 10-1 transmits a connection request with location information included therein, a display screen SD2 is displayed on the touch panel T2 of the staff terminal 20-1 that receives the connection request. The display screen SD2 displays the location information of the user terminal 10-1 as transmission origin information MC3, in addition to the message MC1, the terminal identifier MC2, the staff image PC3, the display area PC4, the start call button BT3, and the reject call button BT4, similar to those of the display screen SD1 shown in FIG. 14.

The staff C1 can check the transmission origin information MC3 before starting communication with the user U1 to ascertain whether the originator of the communication is in A station S1 or B station S2. The staff C1 can thereby smoothly respond to the user U1. If links to a station guide map and an surrounding area map for the station where the user terminal 10-1 is located are automatically displayed on the display screen SD2, it becomes possible to more smoothly respond to the user U1.

As described above, in the second embodiment, the staff terminal 20-1 related to A station S1 and B station S2 is provided, and a connection request from the user U1 that has received the first authentication information transmitted in A station S1 and a connection request from the user U2 that has received the second authentication information transmitted in B station S2 are both connected to the staff terminal 20-1. Thus, it is not necessary to provide, in each station, a terminal that serves as a connection destination for connection requests from the user terminals 10-1, 10-2, thereby reducing terminal-related costs (facility costs as well as personnel costs).

In addition, in the second embodiment, the staff terminal 20-1 is notified of the location of the user terminal 10-1 or 10-2 that is the origin of communication. The staff C1 can thereby ascertain the location of the user terminal 10-1 or 10-2 and smoothly communicate with the user U1 or U2. In addition, in the second embodiment, authentication information is used instead of location information, so that the location of the user terminal 10-1 can be identified, even if the user terminal 10-1 is not equipped with a location information acquisition device, such as a GPS receiver.

C: Third Embodiment

The third embodiment will be described. In each of the embodiments illustrated below, elements that have the same functions as those in the first Embodiment have been assigned the same reference symbols used to describe the first Embodiment and detailed descriptions thereof have been appropriately omitted.

In the third embodiment, a case in which a plurality of staff bases are associated with one facility will be described. That is, a case in which the first staff base K1 and a third staff base K3 are associated with A station S1 will be described.

Figure 19:
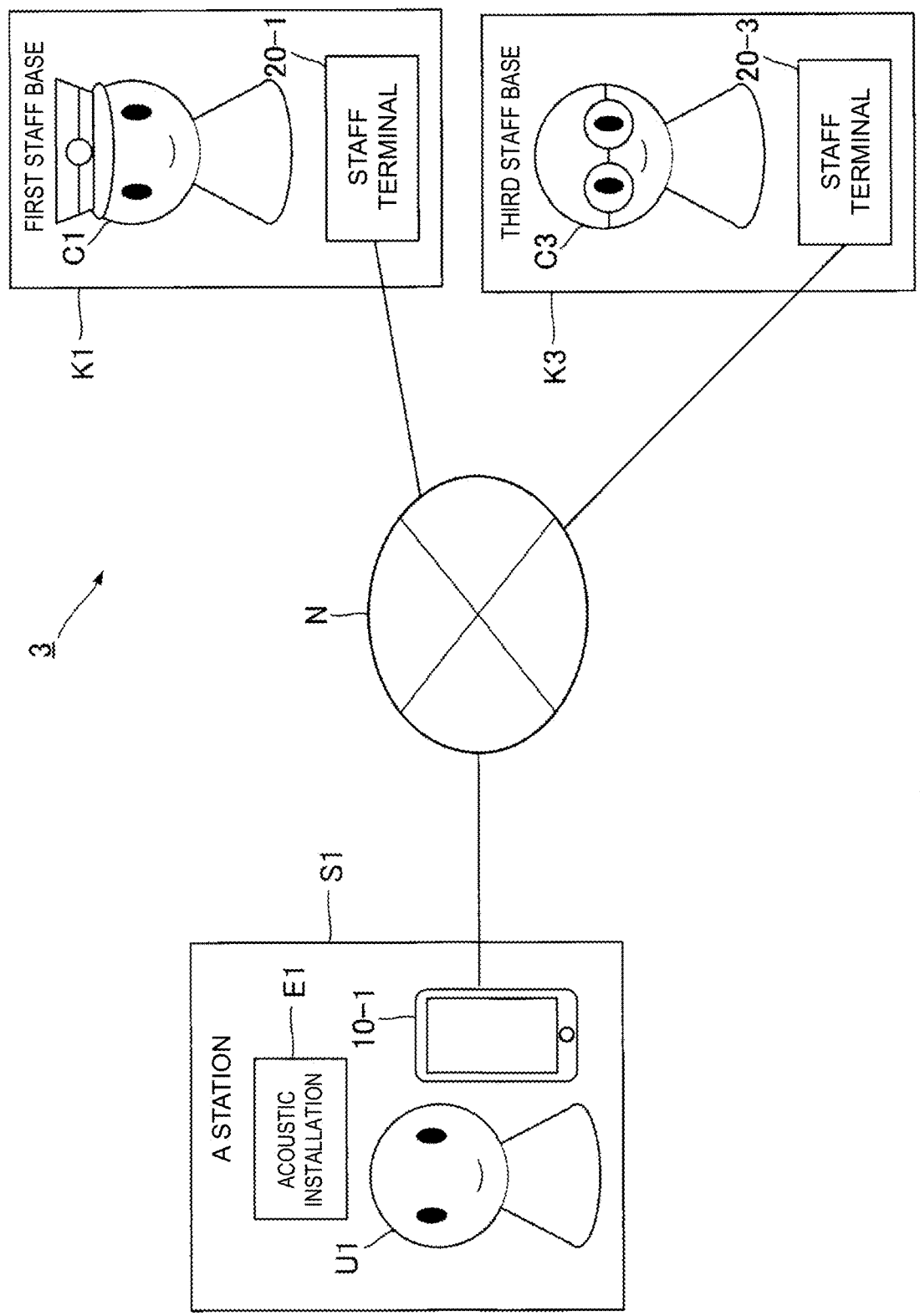
FIG. 19 is a diagram showing a configuration of a communication system 3 according to a third embodiment.

FIG. 19 is a diagram showing a configuration of a communication system 3 according to the third embodiment. In FIG. 19, an illustration of the configuration relating to B station S2 is omitted. The communication system 3 is provided with the first staff base K1 and the third staff base K3 as staff base corresponding to A station S1. The third staff base K3 is provided with a staff terminal 20-3. The staff terminal 20-3 is an information processing terminal held by staff C3 of A station S1, such as a smartphone, a tablet, a laptop computer, a desktop computer, or a telephone. In the present embodiment, the staff terminal 20-3 is a tablet. The configuration of the staff terminal 20-3 is the same as the configuration of the staff terminal 20-1 shown in FIGS. 5 and 6.

The third staff base K3 can be provided in a remote location away from A station S1, or be provided within A station S1. In addition, the third staff base K3 can be the same location as the first staff base K1. In this case, the staff terminal 20-3 and the staff terminal 20-1 are disposed in the same location (such as a station attendant's office inside A station S1. The staff C3 is able to handle conversation and text chat in English. In addition, the staff C1 is able to handle conversation and text chat in Japanese.

Figure 20:
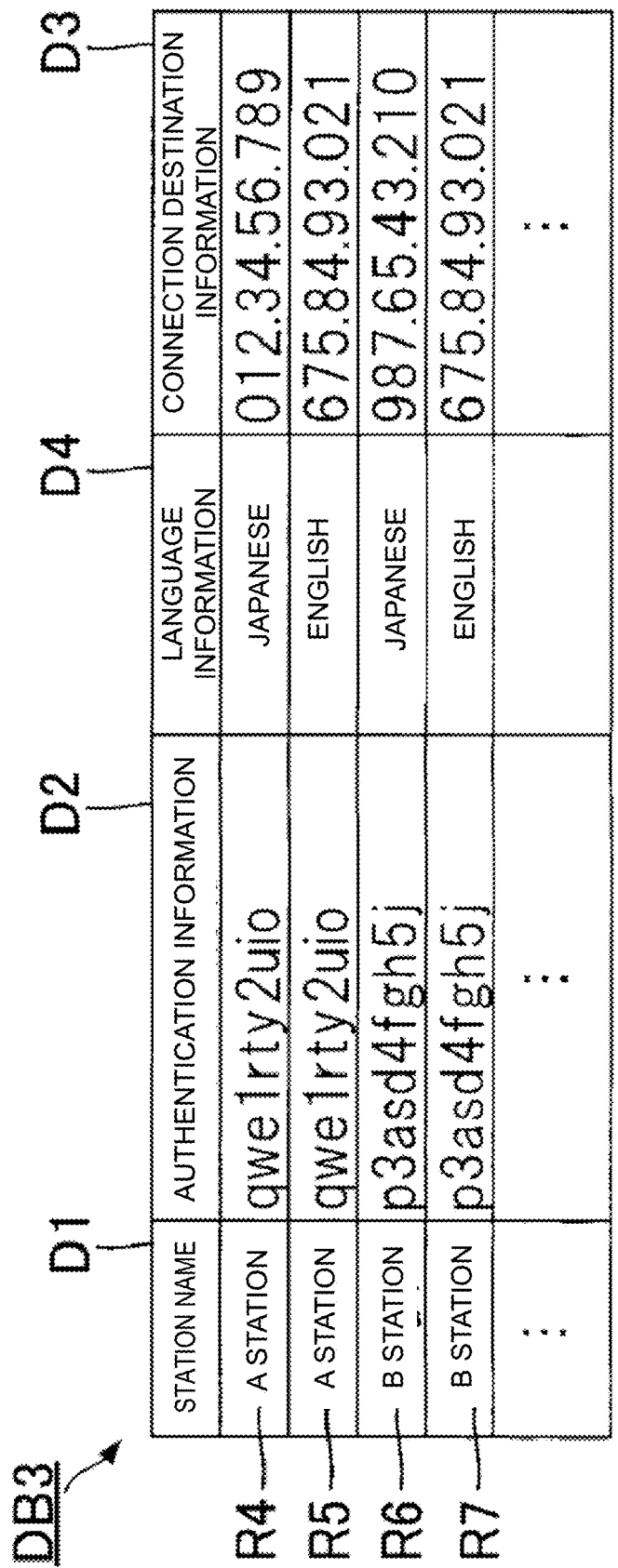
FIG. 20 is a diagram showing one example of an authentication information database DB3 of the third embodiment.

FIG. 20 is a diagram showing one example of an authentication information database DB3 of the third embodiment. The authentication information database DB3 is stored in the storage device 12. The authentication information database DB3 contains records R (R4-R7), including language information D4, in addition to the station name information D1, the authentication information D2, and the connection destination information D3. The language information D4 indicates the language specified by the user U1 as the language to be used when communicating with the staff C1, C3 in the settings screen SC4 shown in FIG. 11. For example, records R4 and R5 both have the same authentication information D2 as well as having A station S1 as the station name information D1. On the other hand, the language information D4 of record R4 is Japanese while the language information D4 of record R5 is English. The connection destination information D3 of record R4 and the connection destination information D3 of record R5 are different. The connection destination information D3 of record R4 is the address of the staff terminal 20-1, and the connection destination information D3 of record R5 is the address of the staff terminal 20-3.

Therefore, if the user terminal 10-1 located in A station S1 has specified Japanese as the language, communication from the user terminal 10-1 is connected to the staff terminal 20-1. If the user terminal 10-1 located in A station S1 has specified English as the language, communication from the user terminal 10-1 is connected to the staff terminal 20-3. That is, in the third embodiment, the communication control unit 116 of the user terminal 10-1 identifies the terminal device to connect to as the staff terminal from among the staff terminal 20-1 or 20-3, on the basis of the language selected by the user U1. By changing the connection destination in this manner, it becomes possible to handle inquiries in various languages in the staff communication function, which improves the convenience for the user U1.

In addition, records R6 and R7 both have the same authentication information D2 as well as having B station S2 as the station name information D1. The language information D4 of record R6 is Japanese while the language information D4 of record R7 is English. Here, while the connection destination information D3 of record R6 is different from the connection destination information D3 of record R4, the connection destination information D3 of record R7 is the address of the same staff terminal 20-3 as that of the connection destination information D3 of record R5. That is, when inquiring in Japanese, the connection destination of communication is different depending on whether the call is made from A station S1 or from B station S2, but when inquiring in English, the connection destination of communication is the same regardless of whether the call is made from A station S1 or B station S2.

With this configuration, it is possible to efficiently handle inquiries in English, which occur more infrequently in Japan than inquiries in Japanese. More specifically, if A station S1 and B station S2 are in Japan, there are fewer people who can communicate in English than people who can communicate in Japanese. In addition, it can be expected that there will be fewer inquiries in English than inquiries in Japanese. Therefore, it cannot be efficient to assign personnel that can communicate in English to both A station S1 and B station S2. If the staff C3 handles both inquires in English transmitted from A station S1 and inquiries in English transmitted from B station S2, it becomes possible to improve the convenience for the user U1 while suppressing costs for the railway operator.

In the foregoing, the terminal to connect to is determined from either the staff terminal 20-1 or the staff terminal 20-3 on the basis of the language setting, but the terminal to connect to can be determined on the basis of the communication method set by the user U1. As a result, division of work becomes possible, such as visually-impaired attendants handling voice calls and hearing-impaired attendants handling text chats.

As described above, in the third embodiment, the connection destination of communication from the user terminal 10-1 is selected from the staff terminal 20-1 or 20-3, on the basis of the language specified by the user U1. As a result, it becomes possible to select, as the connection destination for the user terminal 10-1, the staff terminal 20-1 or 20-3 held by the staff C1 or C3 who can use the language selected by the user U1, so that the staff C1 or C3 can smoothly communicate with the user U1.

D: Modified Examples

Specific modified embodiments to be added to each of the embodiments exemplified above are illustrated below. A plurality of embodiments selected at random from the following examples can be appropriately combined as long as they are not mutually contradictory.

(1) In each of the embodiments described above, the authentication information is transmitted from the acoustic installations E1, E2 using acoustic communication. The invention is not limited thereto; the authentication information can be transmitted using another communication method, such as a beacon or Near Field Communication (NFC).

(2) In each of the embodiments described above, it is confirmed that the user terminal 10-1 is located in A station S1 using only the authentication information transmitted from the sound output device EA. The invention is not limited thereto; the authentication information transmitted from the sound output device EA and other authentication information that can be acquired within A station S1 can be combined to confirm that the user terminal 10-1 is located in A station S1. Other authentication information can be an information code transmitted to the user terminal 10-1 that is in A station S1 using another communication method, such as a beacon or NFC, or can be location information of the user terminal 10-1 identified with a GPS. In addition, the other authentication information can be an information code displayed in A station S1. In this case, the user terminal 10-1 can read a display of the information code using the image capture device 18.

The authentication information transmitted from the sound output device EA is referred to as third authentication information, and the other authentication information is referred to as fourth authentication information. The user terminal 10-1 that transmits a connection request is a terminal that receives the third authentication information and that has the fourth authentication information that can be acquired within A station S1. The communication control unit 212 of the staff terminal 20-1 starts communication between the staff terminal 20-1 and the user terminal 10-1 in response to a connection request transmitted from the user terminal 10-1 described above.

According to the modified example described above, the first authentication information and the second authentication information can be used to more reliably confirm that the user terminal 10-1 is located in A station S1.

(3) In each of the embodiments described above, the user terminal 10-1 determines whether to enable the staff communication function on the basis of whether authentication information has been received. The invention is not limited thereto; for example, the staff terminal 20-1 can determine whether to start communication with the user terminal 10-1. In this case, for example, the user terminal 10-1 transmits the connection request to be transmitted to the staff terminal 20-1 with the authentication information acquired in A station S1 included therein. If authentication information corresponding to A station is included in the connection request, the staff terminal 20-1 starts communication with the user terminal 10-1. If the user terminal 10-1 is not in A station, authentication information corresponding to A station cannot be included in the connection request, so communication between the staff terminal 20-1 and the user terminal 10-1 is not started.

According to the modified example described above, the processing load of the user terminal 10-1 can be reduced. In addition, for example, in a mode in which the authentication information is changed at prescribed time intervals, it is not necessary to notify the user terminal 10-1 of the authentication information after a change, so the processing load of the entire communication system can be reduced.

(4) In each of the embodiments described above, a case was described in which one piece of authentication information is used for one facility. For example, it was assumed that there is one piece of authentication information of A station S1 for the entire A station S1. The invention is not limited thereto; the authentication information can be different depending on the location even within one facility. For example, different authentication information can be assigned to each of platform 1, platform 2, the concourse inside ticket gates, and the concourse outside of ticket gates, of A station S1.

FIG. 21 is a diagram showing one example of an authentication information database DB4 in a modified example. The authentication information database DB4 is stored in the storage device 12. The authentication information database DB4 contains records R (R8-R11), including location information D5, in addition to the station name information D1, the authentication information D2, and the connection destination information D3. The location information D5 is information for identifying locations within A station S1. The station name information D1 can be included in the location information D5. Different authentication information D2 is assigned to each location indicated in the location information D5. With respect to the connection destination information D3, a different connection destination can be assigned depending on the location, or the same connection destination can be assigned to a plurality of locations. For example, in the authentication information database DB4, the staff terminal 20-1 is assigned as the connection destination for platform 1, platform 2, and the concourse inside ticket gates. A terminal other than the staff terminal 20-1 is assigned as the connection destination for the concourse outside ticket gates.

The authentication information D2 of platform 1 is transmitted from the sound output device EA installed on platform 1. The authentication information D2 of platform 2 is transmitted from the sound output device EA installed on platform 2. The same applies to the concourse inside ticket gates and the concourse outside ticket gates. If the user terminal 10-1 is located on platform 1, the sound collection device 13 of the user terminal 10-1 receives the authentication information of platform 1. The control device 11 of the user terminal 10-1 can crosscheck the authentication information that has been received with the authentication information database DB4 to identify that the location of the user terminal 10-1 is platform 1. For example, if a connection request is transmitted from the user terminal 10-1 to the staff terminal 20-1, "platform 1" can be included as the location information. The staff terminal 20-1 can display "platform 1" (for example, displaying the transmission origin information MC3 shown in FIG. 18) in response to a connection request from the user terminal 10-1, thereby allowing the staff C1 to know the location within A station S1 from which the user terminal 10-1 transmitted the connection request.

In addition, the authentication information database DB4 can be stored in the storage device 22 of the staff terminal 20-1, and authentication information can be included as location information when the user terminal 10-1 transmits a connection request to the staff terminal 20-1. In this case, the staff terminal 20-1 can crosscheck the authentication information that is included in the connection request with the authentication information database DB4 to identify that the location of the user terminal 10-1 that transmitted the connection request is platform 1.

In this manner, by varying the authentication information depending on the location within one facility, the location of the user terminal 10-1 within the facility can be more precisely ascertained, and the staff C1 can efficiently handle inquiries from the user U1.

For example, if the facility is a shopping center, different authentication information can be assigned to each sales floor, such as the food department and the men's clothing department, and, for each piece of authentication information, a terminal held by a staff member of each sales floor can be designated as the connection destination serving as the staff terminal. As a result, a staff member who has knowledge of the sales floor can immediately respond to an inquiry from a user, which improves the convenience for both the user and the staff member.

(5) The content of conversations that have taken place between the user U1 and the staff C1 using the staff communication function can be analyzed and reflected on the content of the questions and answers that is displayed when the Q&A button ME4 shown in FIG. 9 is selected, for example. In particular, if the questions and answers is in the form of an AI chatbot, conversations that have taken place between the user U1 and the staff C1 can be used as learning data for the AI. As a result, the content of the questions and answers is updated based on actual inquiries, which improves the convenience for the user U1.

(6) If the language set in the user terminal 10-1 is a language that cannot be supported by the staff C1, translation can be performed by a translation server (not shown) that is connected to the communication network N, for example. In this case, the translation server temporarily receives the data transmitted from the user terminal 10-1 (call voice data, video call data, text data, etc.), and translates and then transmits the data to the staff terminal 20-1. In addition, the translation server also temporarily receives the data transmitted from the staff terminal 20-1, and translates and then transmits the data to the user terminal 10-1. Alternatively, a translation software can be installed in the staff terminal 20-1, and data transmitted from the user terminal 10-1 can be translated with the translation software and output to the staff C1.

In addition, if the language set in the user terminal 10-1 is a language that cannot be supported by the staff C1, a translator terminal (not shown) held by a translator who can support said language can also be designated as a staff terminal. In this case, communication is carried out between the user terminal 10-1, the staff terminal 20-1 held by a station attendant, and a translator terminal held by a translator.

According to the modified example described above, inquiries from the user U1 can be handled even if the staff C1 cannot support the language set in the user terminal 10-1, which improves the convenience for the user U1.

(7) In each of the embodiments described above, a case was described in which one user terminal 10-1 is connected to one staff terminal 20-1. The invention is not limited thereto; for example, it can be configured such that a plurality of user terminals that have received the authentication information transmitted within the facility can simultaneously connect to one staff terminal.

For example, if the facility is a museum, curators are the staff, terminals held by curators are staff terminals, and terminals of participants in a guided tour of the museum are user terminals. During a guided tour of the museum, a staff terminal of a curator giving explanations is connected to the user terminals of all the participants of the guided tour. As a result, even if there are many participants of the guided tour, it is easy for all the participants to listen to the curator's explanations. In addition, since it is easy to hear each other's voices, it becomes easier for the participants to ask the curator questions.

Additionally, if the language used by the curator is different from the language used by a participant, the communication between the staff terminal and the user terminal can be carried out via a translation server (or a translator terminal), as described above in (6). As a result, even if the language used by the curator is different from the language used by a participant, the participant can understand the curator's explanations and ask the curator questions, so the participant can deepen understanding of the content of the exhibits.

(8) As described above, the functions of the user terminals 10-1, 10-2 (the display control unit 110, the setting reception unit 111, the guidance information acquisition unit 112, the authentication information acquisition unit 114, and the communication control unit 116) are realized by means of cooperation between one or a plurality of processors that constitute the control device 11, and a program stored in the storage device 12. Additionally, as described above, the functions of the staff terminals 20-1, 20-2 (the display control unit 210 and the communication control unit 212) are realized by means of cooperation between one or a plurality of processors that constitute the control device 21, and a program stored in the storage device 22.

The foregoing program can be provided in a form stored in a computer-readable storage medium and installed in a computer. The storage medium is, for example, a non-transitory storage medium, a good example of which is an optical storage medium (optical disc) such as a CD-ROM, but can include storage media of any known form, such as a semiconductor storage medium or a magnetic storage medium. Non-transitory storage media include any storage medium that excludes transitory propagating signals and does not exclude volatile storage media. In addition, in a configuration in which a distribution device distributes the program via a communication network, a storage medium that stores the program in the distribution device corresponds to the non-transitory storage medium.

E: Additional Statement

For example, the following configurations can be understood from the embodiments exemplified above.

A communication method according to one aspect (Aspect 1) of the present disclosure comprises: transmitting authentication information from a transmitter that is inside a facility to areas within the facility; and starting communication between a user terminal that has received the authentication information transmitted by the transmitter and a staff terminal held by the facility staff, in response to a connection request transmitted from the user terminal. According to the aspect described above, authentication information is transmitted from a transmitter in the facility, so, compared with displaying the authentication information at a specific location within the facility, the user can easily obtain the authentication information and easily communicate with the staff. In addition, communication with the staff terminal is started in response to a connection request from a user terminal that has received authentication information, so communication is not started from a user terminal that has not received the authentication information, that is, a user terminal that is not located in the facility. Thus, it is possible to prevent malicious prank communications as well as unintentional erroneous communications.

In a specific example (Aspect 2) of Aspect 1, transmission of the authentication information includes transmitting first authentication information from a first transmitter in a first facility to areas within the first facility, and transmitting second authentication information from a second transmitter in a second facility to areas within the second facility, and starting of the communication includes starting communication between a first user terminal that has received the first authentication information transmitted by the first transmitter and a staff terminal related to the first facility and the second facility, in response to a connection request transmitted from the first user terminal, and starting communication between a second user terminal that has received the second authentication information transmitted by the second transmitter and the staff terminal, in response to a connection request transmitted from the second user terminal. According to the aspect described above, a staff terminal related to the first facility and the second facility is provided, and a connection request from the first user that has received the first authentication information transmitted in the first facility and a connection request from the second user that has received the second authentication information transmitted in the second facility are both connected to the staff terminal. Thus, it is not necessary to provide, in each facility, a terminal that serves as a connection destination for connection requests from the user terminals, thus reducing terminal-related costs (facility costs as well as personnel costs).

In a specific example (Aspect 3) if Aspect 1 or 2, the connection request includes location information indicating the location of the user terminal, and the location of the user terminal is notified to the staff terminal in the communication with the staff terminal. According to the aspect described above, the staff can ascertain the location of the user terminal and smoothly communicate with the user.

In a specific example (Aspect 4) of Aspect 3, the location from where the authentication information is transmitted can be identified based on the authentication information, and the location information is the authentication information received by the user terminal. According to the aspect described above, authentication information is used instead of location information, so that the location of the user terminal can be identified, even if the user terminal is not equipped with a location information acquisition device, such as a GPS receiver.

In a specific example (Aspect 5) of any one of Aspects 1 to 4, the authentication information is different for each location from where the authentication information is transmitted, and a terminal device that connects as the staff terminal is identified based on the authentication information. According to the aspect described above, the staff terminal is identified on the basis of the location of the user terminal. As a result, the user is more likely to be able to obtain the necessary information in a short period of time, which improves convenience.

In a specific example (Aspect 6) of any one of Aspects 1 to 5, specification of a communication mode used in communication with the staff terminal is received from a user, and in the communication between the staff terminal and the user terminal, a user interface corresponding to the communication mode specified by the user is activated on the staff terminal and the user terminal. According to the aspect described above, the user interface of the communication mode specified by the user is activated. As a result, the user can smoothly communicate with the staff in the mode specified by the user themselves.

In a specific example (Aspect 7) of any one of Aspects 1 to 6, selection of a language used in communication with the staff terminal is received from a user, and a terminal device that connects as the staff terminal is identified on the basis of the language selected by the user. According to the aspect described above, the staff terminal is selected on the basis of the language specified by the user. As a result, it becomes possible to select, as the connection destination of the user terminal, the staff terminal held by a staff who can use the language selected by the user, so that the staff can smoothly communicate with the user.

In a specific example (Aspect 8) of any one of Aspects 1 to 7, the authentication information is third authentication information, and when starting the communication, communication between the staff terminal and the user terminal is started in response to a connection request transmitted from the user terminal that receives the third authentication information and has the fourth authentication information that can be acquired within the facility. According to the aspect described above, the third authentication information and the fourth authentication information are used to start communication between the staff terminal and the user terminal. Therefore, it is possible to more reliably confirm that the user terminal is located within the facility.

A communication system according to one aspect (Aspect 9) of the present disclosure comprises: a transmitter provided in a facility and that transmits authentication information to areas within the facility; and a communication device that starts communication between a user terminal that has received the authentication information transmitted by the transmitter and a staff terminal held by the facility staff, in response to a connection request transmitted from the user terminal.

What is claimed is:

1. A communication method comprising:
   transmitting authentication information from a transmitter disposed inside a facility to an area within the facility; and
   starting communication between a staff terminal held by facility staff of the facility and a user terminal that has received the authentication information transmitted by the transmitter, in response to a connection request transmitted from the user terminal.

2. The communication method according to claim 1, wherein
   the transmitting of the authentication information includes
      transmitting first authentication information from a first transmitter disposed inside a first facility to an area within the first facility, and
      transmitting second authentication information from a second transmitter disposed inside a second facility to an area within the second facility, and
   the starting of the communication includes
      starting communication between a staff terminal related to the first facility and the second facility and a first user terminal that has received the first authentication information transmitted by the first transmitter, in response to a connection request transmitted from the first user terminal, and
      starting communication between the staff terminal and a second user terminal that has received the second authentication information transmitted by the second transmitter, in response to a connection request transmitted from the second user terminal.

3. The communication method according to claim 1, wherein
   the connection request includes location information indicating a location of the user terminal, and
   the location of the user terminal is notified to the staff terminal in the communication between the staff terminal and the user terminal.

4. The communication method according to claim 3, wherein
   a location from which the authentication information is transmitted is identifiable based on the authentication information, and
   the location information is the authentication information received by the user terminal.

5. The communication method according to claim 1, further comprising
   identifying a terminal device that is connected as the staff terminal based on the authentication information, wherein
   the authentication information is different for each location from which the authentication information is transmitted.

6. The communication method according to claim 1, further comprising
   receiving, from a user of the user terminal, specification of a communication mode used in the communication between the staff terminal and the user terminal, wherein
   in the communication, a user interface corresponding to the communication mode specified by the user is activated on the staff terminal and the user terminal.

7. The communication method according to claim 1, further comprising
   receiving, from a user of the user terminal, selection of a language used in the communication between the staff terminal and the user terminal, and identifying a terminal device that is connected as the staff terminal based on the language selected by the user.

8. The communication method according to claim 1, wherein the starting of the communication is performed in response to the connection request being transmitted from the user terminal that receives third authentication information as the authentication information and has fourth authentication information that is acquirable within the facility.

9. A communication system comprising:

a transmitter disposed inside a facility and configured to transmit authentication information to an area within the facility; and a wireless or wired communicator connected wirelessly or by wire to a communication network, the wireless or wired communicator being configured to start communication, via the communication network, between a staff terminal held by facility staff of the facility and a user terminal that has received the authentication information transmitted by the transmitter, in response to a connection request transmitted from the user terminal.

10. The communication system according to claim 9, wherein the transmitter is configured to transmit first authentication information from a first transmitter disposed inside a first facility to the area within the first facility, and transmit second authentication information from a second transmitter disposed inside a second facility to an area within the second facility, and the wireless or wired communicator is configured to start communication between a staff terminal related to the first facility and the second facility and a first user terminal that has received the first authentication information transmitted by the first transmitter, in response to a connection request transmitted from the first user terminal, and start communication between the staff terminal and a second user terminal that has received the second authentication information transmitted by the second transmitter, in response to a connection request transmitted from the second user terminal.

11. The communication system according to claim 9, wherein the connection request includes location information indicating a location of the user terminal, and the location of the user terminal is notified to the staff terminal in the communication between the staff terminal and the user terminal.

12. The communication system according to claim 11, further comprising an electronic controller including at least one processor and configured to receive the authentication information at the user terminal, wherein a location from which the authentication information is transmitted is identifiable based on the authentication information, and the location information is the authentication information.

13. The communication system according to claim 9, further comprising an electronic controller including at least one processor and configured to identify a terminal device that is connected as the staff terminal based on the authentication information, wherein the authentication information is different for each location from which the authentication information is transmitted.

14. The communication system according to claim 9, further comprising an electronic controller including at least one processor and configured to receive, from a user of the user terminal, specification of a communication mode used in the communication between the staff terminal and the user terminal, and configured to activate a user interface corresponding to the communication mode specified by the user in the communication.

15. The communication system according to claim 9, further comprising an electronic controller including at least one processor and configured to receive, from a user of the user terminal, selection of a language used in the communication between the staff terminal and the user terminal, and configured to identify a terminal device that is connected as the staff terminal based on the language selected by the user.

16. The communication system according to claim 9, wherein the wireless or wired communicator is configured to start the communication between the staff terminal and the user terminal, in response to the connection request transmitted from the user terminal that receives third authentication information as the authentication information and has fourth authentication information that is acquirable within the facility.

* * * * *